US007627455B2

(12) United States Patent
Lenz et al.

(10) Patent No.: US 7,627,455 B2
(45) Date of Patent: *Dec. 1, 2009

(54) DISTRIBUTED DIAGNOSTIC OPERATIONS SYSTEM

(75) Inventors: Gary A. Lenz, Chanhassen, MN (US); William C. Schuh, Delavan, WI (US); David P. Culbertson, Bristol, WI (US); Kenneth F. Fennewald, Maryland Heights, MO (US); Louis P. Steinhauser, St. Louis, MO (US); Leon J. McNutt, Houston, MN (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 361 days.

This patent is subject to a terminal disclaimer.

(21) Appl. No.: 11/216,379

(22) Filed: Aug. 31, 2005

(65) Prior Publication Data

US 2006/0058847 A1 Mar. 16, 2006

Related U.S. Application Data

(60) Provisional application No. 60/605,819, filed on Aug. 31, 2004.

(51) Int. Cl.
*G06F 11/30* (2006.01)
(52) U.S. Cl. ....................................... 702/183
(58) Field of Classification Search ................. 702/130, 702/188, 183
See application file for complete search history.

(56) References Cited

U.S. PATENT DOCUMENTS 5,642,301 A 6/1997 Warrior et al.

5,746,511 A 5/1998 Eryurek et al.

(Continued)

FOREIGN PATENT DOCUMENTS

DE 10220390 A1 12/2002

(Continued)

OTHER PUBLICATIONS

Clausen M. et al., "Cryogenic controls for the TESLA test facility", Dec. 15, 1994.

(Continued)

*Primary Examiner*—Drew A Dunn
*Assistant Examiner*—Stephen J Cherry
(74) *Attorney, Agent, or Firm*—Brinks Hofer Gilson & Lione

(57) ABSTRACT

A distributed operations system having integrated diagnostics, a bitbus and a fieldbus and includes a field device for generating a field operating characteristic and a field processing module for receiving the field operating characteristic from the field device. The field processing module includes a field diagnostic component and a field communication component configured for communication over the bitbus. The field processing module is configured for generating field operating data including a field diagnostic parameter as a function of the field operating characteristic. An auxiliary processing module is configured for communicating with the bitbus and receiving the field operating data. The auxiliary processing module includes an auxiliary diagnostic component and an auxiliary communication component having a fieldbus interface and a gateway component. The auxiliary processing module is also configured for generating auxiliary field data as a function of the field operating data and for communicating the auxiliary field data over the fieldbus.

74 Claims, 6 Drawing Sheets

U.S. PATENT DOCUMENTS

| | | | |
|---|---|---|---|
| 5,754,596 A | 5/1998 | Bischoff et al. | |
| 5,764,891 A * | 6/1998 | Warrior | 710/72 |
| 5,828,567 A | 10/1998 | Eryurek et al. | |
| 5,828,851 A | 10/1998 | Nixon et al. | |
| 5,862,052 A | 1/1999 | Nixon et al. | |
| 5,909,368 A | 6/1999 | Nixon et al. | |
| 5,960,214 A | 9/1999 | Sharpe, Jr. et al. | |
| 5,960,375 A | 9/1999 | Warrior et al. | |
| 5,970,430 A | 10/1999 | Burns et al. | |
| 5,978,578 A | 11/1999 | Azarya et al. | |
| 5,995,916 A | 11/1999 | Nixon et al. | |
| 6,026,352 A | 2/2000 | Burns et al. | |
| 6,151,640 A | 11/2000 | Buda et al. | |
| 6,195,591 B1 | 2/2001 | Nixon et al. | |
| 6,266,726 B1 | 7/2001 | Nixon et al. | |
| 6,298,454 B1 | 10/2001 | Schleiss et al. | |
| 6,304,934 B1 | 10/2001 | Pimenta et al. | |
| 6,356,191 B1 | 3/2002 | Kirkpatrick et al. | |
| 6,377,859 B1 | 4/2002 | Brown et al. | |
| 6,397,114 B1 | 5/2002 | Eryurek et al. | |
| 6,405,139 B1 | 6/2002 | Kicinski et al. | |
| 6,434,504 B1 | 8/2002 | Eryurek et al. | |
| 6,446,202 B1 | 9/2002 | Krivoshein et al. | |
| 6,449,574 B1 | 9/2002 | Eryurek et al. | |
| 6,449,715 B1 | 9/2002 | Krivoshein | |
| 6,473,710 B1 | 10/2002 | Eryurek | |
| 6,510,352 B1 | 1/2003 | Badavas et al. | |
| 6,510,397 B1 | 1/2003 | Choe | |
| 6,519,546 B1 | 2/2003 | Eryurek et al. | |
| 6,532,392 B1 | 3/2003 | Eryurek et al. | |
| 6,539,267 B1 | 3/2003 | Eryurek et al. | |
| 6,556,145 B1 | 4/2003 | Kirkpatrick et al. | |
| 6,557,118 B2 | 4/2003 | Schleiss et al. | |
| 6,567,709 B1 | 5/2003 | Malm et al. | |
| 6,594,603 B1 | 7/2003 | Eryurek et al. | |
| 6,615,090 B1 | 9/2003 | Blevins et al. | |
| 6,711,446 B2 | 3/2004 | Kirkpatrick et al. | |
| 6,754,601 B1 | 6/2004 | Eryurek et al. | |
| 6,816,810 B2 | 11/2004 | Henry et al. | |
| 6,907,331 B2 | 6/2005 | Paquet | |
| 7,058,542 B2 | 6/2006 | Hauhia et al. | |
| 7,173,909 B2 | 2/2007 | Deuter et al. | |
| 7,337,369 B2 | 2/2008 | Barthel et al. | |
| 7,370,239 B2 | 5/2008 | Apel et al. | |
| 7,392,165 B2 | 6/2008 | Nixon et al. | |
| 2002/0022991 A1 | 2/2002 | Sharood et al. | |
| 2002/0147511 A1* | 10/2002 | Eryurek et al. | 700/80 |
| 2002/0154603 A1 | 10/2002 | Deuter et al. | |
| 2002/0194547 A1 | 12/2002 | Christensen et al. | |
| 2003/0046382 A1 | 3/2003 | Nick | |
| 2005/0004726 A1 | 1/2005 | Paquet | |
| 2005/0137735 A1 | 6/2005 | Loy et al. | |
| 2007/0010968 A1 | 1/2007 | Longsdorf et al. | |

FOREIGN PATENT DOCUMENTS

WO    WO 2004099889 A1    11/2004

OTHER PUBLICATIONS

Chemane L. A. et al., "Industrial Information Infrastructure and Intelligent Instrumentation-The Options", Jul. 7, 1997.

Marino P. et al., "Using LOTOS in the specification of industrial bus communication protocols", Aug. 21, 2004.

International Search Report and Written Opinion for PCT/US2005/031289.

http://web.archive.org/web/20040605004027/www.eng.ox.ac.uk/World/Research/Summary/B-Invensys.html, Ivensys University Technology Centre for Advanced Instrumentation, Research Summary, Department of Engineering Science, University of Oxford, pp. 1-8, Oct. 14, 2003.

http://web.archive.org/web/20030425143231/http://fieldbus.org/About/FoundationTech/AboutFoundationTech/SupportsInteroperability, Fieldbus Foundation, About Foundation Technology, p. 1, Aug. 30, 2005.

http://web.archive.org/web/20040517042225/fieldbus.org/About/FoundationTech/AboutFoundationTech/cont_body.asp, Fieldbus Foundation, Supports Interoperatbility, p. 1-3, Apr. 25, 2003.

http://web.archive.org/web/20040517042236/fieldbus.org/About/FoundationTech/cont_body.asp, Fieldbus Foundation, What is Fieldbus, p. 1, Aug. 30, 2005.

Horowitz and Hill, The Art of Electronics, Cambridge University Press, 1989, pp. 988-993.

U.S. Patent and Trademark Office Action for U.S. Appl. No. 11/216,381, filed Jan. 18, 2008, pp. 1-27.

U.S. Patent and Trademark Office Action for U.S. Appl. No. 11/216,380, filed Jan. 11, 2008, pp. 1-26.

U.S. Patent and Trademark Office Action for U.S. Appl. No. 11/216,378, filed Dec. 31, 2007, pp. 1-18.

U.S. Patent and Trademark Office Action for U.S. Appl. No. 11/216,380, filed Oct. 15, 2008.

U.S. Patent and Trademark Office Notice of Allowance for U.S. Appl. No. 11/216,378, filed Oct. 6, 2008.

Notice of Allowance for U.S. Appl. No. 11/216,380, Entitled *Distributed Diagnostic Operations System*, Dated Dec. 22, 2008.

European Office Action Dated Apr. 4, 2009.

Notice of Allowance for U.S. Appl. No. 11/216,381, filed Jun. 1, 2009.

* cited by examiner

DISTRIBUTED DIAGNOSTIC OPERATIONS SYSTEM

CROSS-REFERENCE TO RELATED APPLICATIONS

This application claims the benefit of U.S. Provisional Application No. 60/605,819, filed on Aug. 31, 2004. This application is also related to U.S. patent application Ser. No. 11/216,378, filed Aug. 31, 2005, entitled TEMPERATURE SENSING SYSTEM; U.S. patent application Ser. No. 11/216,280, filed Aug. 31, 2005, entitled METHOD OF DIAGNOSING AN OPERATIONS SYSTEM; U.S. patent application Ser. No. 11/216,380, filed Aug. 31, 2005, entitled METHOD OF TEMPERATURE SENSING; and PCT patent application PCT/US2005/031289, filed Aug. 31, 2005, entitled OPERATIONS SYSTEM DISTRIBUTED DIAGNOSTIC SYSTEM. The disclosures of the above applications are incorporated herein by reference.

FIELD OF THE INVENTION

The present invention relates to a distributed operational system and, more specifically, relates to a distributed operational monitoring and controlling system with integrated diagnostics.

BACKGROUND OF THE INVENTION

Manufacturing factories, assembly plants, buildings with temperature control, semiconductor fabrication plants, facilities with energy management systems, and process plants have many systems and operation processes that add to the efficient operation of one or more associated control, maintenance and factory automation systems. Many of the operational processes can be monitored to ensure proper equipment and process functioning and to provide feedback for process control, maintenance (including predictive maintenance), supervisory control and data acquisition (SCADA), and test and automation systems to identify process problems or potential equipment failures. Monitored processes can include the measurement of temperature, flow, pressure, level, current, power, motion, vibration, fluid properties and equipment failure and related data, among others, that are monitored by sensors.

Electronic sensors require additional signal processing of the sensed variable including the transducing of the variable or other characteristics that are transduced into an electrical voltage, current, resonant frequency or digital word that is indicative of the characteristic and which can be transmitted to systems. The signal processing is usually accomplished by a transmitter connected to the sensor or through electronics directly connected to the sensor by a wire or cable or connected wirelessly.

As one example, temperature is an often measured physical variable or characteristic of manufacturing processes. The most common temperature measurement systems utilize thermocouples (TCs), resistance temperature devices (RTDs), thermopiles and/or thermistors to sense the physical temperature variable. Other temperature sensors can include; by way of example, semiconductor based RTDs, diodes, infrared sensors, and resonant quartz sensors.

A typical sensor is wired directly to a single channel of an input/output (I/O) device. This direct wiring method is commonly referred to as point-to-point wiring. In this case, the temperature sensor provides an electrical output where an electrical parameter such as a resistance or a voltage changes with changes in a repeatable manner with temperature. The I/O device then converts the electrical parameter into a standard output compatible with a controller or the input requirements of a monitoring or controlling device. The output of the I/O device can be analog, such as a voltage or a current, or can be digital signal or code such as one that conforms to a digital bus standard such as Ethernet TCP/IP, EtherNet/IP, FDDI, ControlNet, Modbus™ (a trademark of AEG Schneider Corporation), Profibus, ProfiNet, IEEE 802.XX wireless and various fieldbuses or proprietary network protocols. The I/O device used for temperature systems typically converts only one parameter from a temperature sensor such as the parameter that provides the physical variable, temperature. In addition to converting the temperature sensor electrical parameter into a standard output that can be interfaced to a controller or a monitoring or controlling system, the I/O device can also provide additional signal processing. Such signal processing can provide for linearization of the sensor, increasing the output level of the sensor (gain), removing stray electrical noise, and/or providing isolation from stray electrical currents. Traditionally temperature I/O devices are provided by manufacturers such as Action Instruments and Rochester Instruments.

The functions of simple signal processing of temperature sensor electrical parameters are well known and are performed by many manufacturers of temperature I/O device products. One common temperature sensing system uses a transmitter located adjacent to a thermal process. Transmitters are used in approximately 50% of all thermal systems and provide signal processing of the electrical parameter, electrical isolation of the sensor from stray electrical and mechanical noise inputs, linearization and scaling of the electrical output, a local means for calibrating the sensor and a standardized output. Traditional standardized outputs for transmitter-based systems include a two-wire 4-20 mA output, a 10-50 mA output, and a 1-5V output. Traditional temperature transmitters are manufactured by companies such as Rosemount, ABB Hartmann & Braun, and Honeywell. Transmitter based systems are also wired to the I/O device, but the I/O device accommodates only standardized voltage or current inputs and does not provide additional signal processing of the temperature variable. Commercial standard I/O devices are provided by programmable logical controller suppliers such as Siemens, Allen Bradley and Omron. Digital control systems suppliers include Emerson Process, Honeywell, Siemens, Invensys, Yokogawa, and ABB. Third parities often provide input/output interfaces for digital control systems (DCS) (such as a control system used in a process control plant such as chemical, refining, electric power where the materials flow continuously in pipes) or programmable logic controllers (PLC) such as Opto22, Moore Industries, Action Instruments, and Phoenix (PLC's are often used in factories for the control of discrete events like the manufacture of automobiles or widgets or process plants where products are made in batches, like pharmaceuticals). The I/O device can perform a multiplexing function and can convert the temperature signal to a standardized output that can be used by a controller, control systems, or monitoring system. Further, the output from the I/O device is most commonly a digital signal on a fieldbus.

Another form of a sensor-transmitter based monitoring system includes a microprocessor located at or near the sensor. These "smart transmitters" were first introduced in the 1980s and have the ability to output or communicate a digital message over a bus. Smart transmitters provide for improved signal processing and linearization using the microprocessor with embedded or related software programs. In addition, a digital output is communicated over a bus and enables the smart transmitters to be wired in a "multi-dropped" fashion that reduces the wiring and the number of I/O channels for a particular operational application. Smart transmitters can communicate digitally to an I/O using HART®, Foundation Fieldbus, Profibus PA, or proprietary protocols such as the Honeywell DE, Yokogawa Brain, or Foxboro I/A.

The I/O device used with a smart transmitter converts the digital input from a transmitter to a digital output (usually at a higher baud rate and/or different protocol) that is compatible with a controller connected to the output of the I/O device. The digital I/O device does not normally provide for signal conditioning of the transmitter variable, but functions as a data concentrator and protocol converter. The integral power supply in the I/O can often provide electrical power over the wire to the transmitters With the introduction of digital smart sensors in the 1980's, the transmitter and controller manufacturers introduced a plethora of digital communication protocols often referred to as fieldbuses. Fieldbus protocols can be used with several types of physical media including 2 and 4 wire, optical media, wireless, etc. Generally, the lowest speed fieldbus provides a high speed two wire communication protocol that can be used to digitally integrate sensors, actuation devices, controls, monitoring systems and equipment with an operations or management system. The fieldbus is characterized by low power consumption and 32 bit messaging capability built on a standard open protocol. Fieldbus transmitters and systems provide higher speed (baud rate) buses and have the ability to handle large amounts of data. A typical data rate for a fieldbus is 31.25 Kbps. Fieldbuses are also limited to the delivery of relatively low levels of electrical power to assure that the fieldbus-based transmitters satisfy electrical power requirements of intrinsically safe or increased safety electrical industry standards required for safe operation in process environments where explosive gases may be present.

A fieldbus-based transmitter can be connected to a control system and an enterprise asset management (EAM) system that uses diagnostics information from the transmitter for process, system, transmitter or equipment diagnostics. The fieldbus transmitter has the ability to provide large amounts of data at data rates of up to 32 kb/s while limiting its power consumption to low levels as required for intrinsically safe systems. Typically, manufacturers provide diagnostics information from their transmitter products. The diagnostics information is produced by the local transmitter by processing electrical parameters originating from the sensor to provide diagnostics related to the sensor, the process, the sensor wiring, the transmitter electronics, the wiring, and the digital fieldbus. This diagnostics information usually has standard diagnostic parameters as well as diagnostic parameters that are different for each manufacturer, but is readily communicated digitally to and from the fieldbus transmitter over the standard fieldbus to a fieldbus compatible I/O device. The cost of the fieldbus transmitters are often more than twice the price of traditional transmitters and are ten to twenty times the price of a sensor.

One fieldbus manufacturer, Rosemount, Inc., developed a protocol that is called HART® (Highway Addressable Remote Transducer) that is a hybrid protocol. The HART® protocol provides for a frequency shift keying (FSK) digital signal superimposed over the standard 4-20 mA analog wiring formerly used as the transmitter standard. Rosemount, Inc. donated the HART® protocol to the public domain and HART® is now available to all manufacturers through The HART® Communication Foundation (HCF). HART® is now the most frequently used transmitter protocol. A smart HART®-type transmitter can replace traditional 4-20 mA transmitters without changes in the wiring or I/O device if the user wants only a temperature parameter. HART® can also provide digital information with an associated change in the I/O device. With the advent of the smart digitally communicating transmitters, additional information can also be communicated from the transmitter such as field device tag number, manufacturer's ID, scaling factor, simple electronics diagnostics.

Other digital protocols have also emerged such as Modbus™ and, most recently higher speed protocols with the ability to provide distributed computing have been introduced. Some fieldbus protocols such as the Foundation fieldbus, ProfiNet and Profibus PA provide for standardized messaging and parameters for diagnostics. Other systems provide a diagnostic capability such as a self-validating sensor (SEVA) that includes diagnostics alerts.

Fieldbus transmitters are often more than twice as expensive as traditional transmitters, due in part to the more sophisticated electronics required to process more parameters and to the complexity of the communications signal processing for a fieldbus. Many operational or process systems do not require the full capabilities of the fieldbus and do not justify the high implementation cost, especially when monitoring simple, less-costly sensors, actuation devices, and discrete devices such as contact closures, switches, and/or digital on-off devices. As such, there is a need for a simple, less costly system and method that provides many of the higher level diagnostic functions available with the fieldbus technology.

One such alternative for a lower cost operational communication system is the "bitbus." A bitbus typically provides 8 bits of messaging information. A bitbus can carry relatively high speed messaging at a low cost. One such bitbus is the DeviceNet™ (a trademark of Open DeviceNet™ Vendors Association (ODVA)) that is an extension of an automotive digital bus, the Car Automation Network (CAN). A second bitbus, AS-Interface (AS-i), was developed in Europe for simple digital or logical inputs for factory automation systems and is, similarly, very low cost.

Generally, current bitbus-based devices do not include extensive diagnostic capabilities, do not provide signal conditioning that is often required in a harsh operating environment, and do not interface well with higher level operational systems. Due to the limited bandwidth of the bitbus, current bitbus systems do not include digital diagnostics information processing of diagnostic parameters that are contained in the digital bitbus message from a sensor or actuating device.

SUMMARY OF THE INVENTION

Various embodiments of the present invention provide an improved distributed operations system for monitoring, controlling, diagnosing or acquiring data from field devices that operate over a bitbus and interface to a fieldbus.

In one aspect of the invention, a distributed operations system having integrated diagnostics and a bitbus and a fieldbus includes a field device for generating a field operating characteristic and a field processing module for receiving the field operating characteristic from the field device. The field processing module includes a field diagnostic component and a field communication component configured for communication over the bitbus. The field processing module is configured for generating field operating data including a field diagnostic parameter as a function of the field operating characteristic. An auxiliary processing module is configured for communicating with the bitbus and receiving the field operating data. The auxiliary processing module includes an auxiliary diagnostic component and an auxiliary communication component having a fieldbus interface and a gateway component. The auxiliary processing module is also configured for generating auxiliary field data as a function of the field operating data and for communicating the auxiliary field data over the fieldbus.

In another aspect of the invention, a distributed operations system with integrated diagnostics includes a bitbus, a first field device for generating a first field operating characteristic, and a second field device for generating a second field operating characteristic. A first field processing module is configured for receiving the first field operating characteristic from the first field device and includes a first field diagnostic component and a first field communication component configured for communication over the bitbus. The first field processing module is configured for generating first field operating data including a first field diagnostic parameter as a function of the first field operating characteristic. A second field processing module is configured for receiving the second field operating characteristic from the second field device and includes a second field diagnostic component and a second field communication component configured for communication over the bitbus. The second field processing module is configured for generating second field operating data including a second field diagnostic parameter as a function of the second operating characteristic. An auxiliary processing module is configured for communicating with the bitbus and receiving the first field operating data from the first field processing module and the second field operating data from the second field processing module. The auxiliary processing module includes an auxiliary diagnostic component and an auxiliary communication component having a fieldbus interface and a gateway component. The auxiliary processing module is configured for generating auxiliary field data as a function of at least one of the first field operating data and the second field operating data and for communicating the auxiliary field data over a fieldbus.

In still another aspect of the invention, a distributed operations system with integrated diagnostics having a bitbus includes a first field device for generating a first field operating characteristic, and a second field device for generating a second field operating characteristic. A field processing module is configured for receiving the first field operating characteristic from the first field device and the second field operating characteristic from the second field device and includes a field diagnostic component and a field communication component for communicating with the bitbus. The field processing module is configured for generating field operating data including at least one of a first field diagnostic parameter as a function of the first field operating characteristic and a second field diagnostic parameter as a function of the second field operating characteristic. An auxiliary processing module is configured for communicating with the bitbus and receiving the generated field operating data, said auxiliary processing module including an auxiliary diagnostic component and an auxiliary communication component having a fieldbus interface and a gateway component. The auxiliary processing module is configured for generating auxiliary field data as a function of the received field operating data and for communicating the auxiliary field data over a fieldbus.

In another aspect of the invention, a distributed operations system having integrated diagnostics includes a field device such as a sensor or an actuator for generating a field operating characteristic. The system also includes a field processing module connected to the field device for receiving the field operating characteristic from the field device. The field processing module includes a field diagnostic component and a field communication component and is configured for generating field operating data, including a field diagnostic parameter as a function of the field operating characteristic. The system also includes a bitbus for communication with the field processing module and for receiving the field operating data from the field processing module. The system further includes an auxiliary processing module for communicating with the bitbus and for receiving the field operating data. The auxiliary processing module includes an auxiliary diagnostic component and an auxiliary communication component that includes a fieldbus interface and a gateway component. The auxiliary processing module is configured for generating auxiliary field data as a function of the field operating data and for communicating the auxiliary field data over a fieldbus.

In another aspect of the invention, a temperature sensing and diagnostics system having a temperature sensor for generating a temperature characteristic includes a field processing module adapted for coupling to the temperature sensor and for receiving the temperature characteristic from the temperature sensor. The field processing module includes a field diagnostic component and a field communication component. The field processing module is adapted to generate field operating data including a temperature diagnostic parameter as a function of the temperature characteristic. The system further includes a bitbus for communicating with the field processing module and for receiving the field operating data from the field processing module. The system also includes an auxiliary processing module for communicating with the bitbus and for receiving the field operating data. The auxiliary processing module includes an auxiliary diagnostic component and an auxiliary communication component having a fieldbus interface and a gateway component. The auxiliary processing module is configured for generating auxiliary field data as a function of the field operating data and for communicating the auxiliary field data over a fieldbus.

In yet another aspect of the invention, a method associated with an operational system includes a field device, a field processing module connected to the field device, a bitbus in communication with the field processing module, a fieldbus, and an auxiliary processing module communicating with the bitbus and the fieldbus, includes generating a field operating characteristic at the field device and processing the field operating characteristic at the field processing module. The method also includes generating field operating data, including a field diagnostic parameter as a function of the field operating characteristic. The method further includes communicating the field operating data including the field diagnostic parameter over the bitbus from the field processing module to the auxiliary processing module. The method also includes generating at the auxiliary processing module auxiliary field data as a function of the received field operating data and communicating the auxiliary field data over the fieldbus.

In still another aspect of the invention, a method associated with a temperature sensing system includes a temperature sensor, a field processing module connected to the temperature sensor, a bitbus in communication with the field processing module, a fieldbus, and an auxiliary processing module communicating with the bitbus and the fieldbus, includes generating a temperature characteristic at the temperature sensor and processing the temperature characteristic at the field processing module. The method also includes generating field operating data, including a temperature diagnostic parameter as a function of the temperature characteristic, and communicating the field operating data including the temperature diagnostic parameter over the bitbus from the field processing module to the auxiliary processing module. The method further includes generating at the auxiliary processing module auxiliary field data as a function of the received field operating data and communicating the auxiliary field data over the fieldbus.

Further aspects of the invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings.

Corresponding reference characters indicate corresponding parts throughout the several views of the drawings.

DETAILED DESCRIPTION OF EXEMPLARY EMBODIMENTS

The following description is merely exemplary in nature and is not intended to limit the invention, its applications, or uses.

In one embodiment, a distributed operations system with integrated diagnostics includes a field device for generating a field operating characteristic. The system also includes a field processing module coupled to the field device for receiving the field operating characteristic from the field device. The field processing module includes a field diagnostic component and a field communication component and is configured for generating field operating data including a field diagnostic parameter as a function of the field operating characteristic. The system also includes a bitbus for communication with the field processing module and for receiving the field operating data from the field processing module. The system further includes an auxiliary processing module for communicating with the bitbus and for receiving the field operating data. The auxiliary processing module includes an auxiliary diagnostic component and an auxiliary communication component that includes a fieldbus interface and a gateway or protocol conversion component. The auxiliary processing module is configured for generating auxiliary field data as a function of the field operating data and for communicating the auxiliary field data over a fieldbus.

Figure 1:
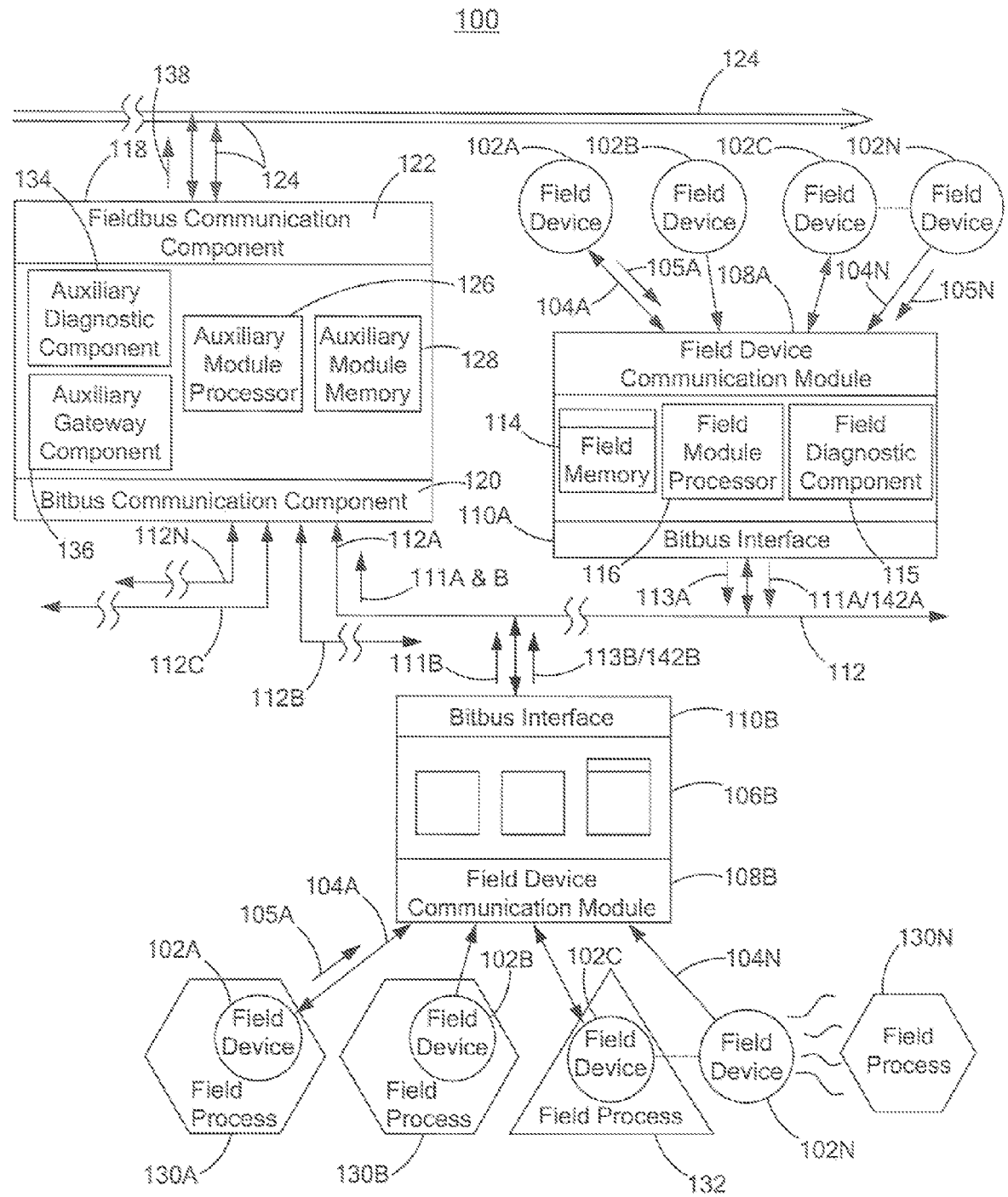
FIG. 1 is a block diagram of a distributed diagnostics monitoring and controlling system according to one embodiment of the invention.

Referring to FIG. 1, a distributed monitoring, controlling and diagnostics system 100 according to one embodiment of the invention is illustrated. The system 100 can be any type of system requiring monitoring and controlling that can include, by way of example, a fabrication system, a manufacturing system, an assembly system, a processing system, an energy management system, a predictive maintenance system, a test system, a packaging system, and an operational control system. The system 100 includes one or more field devices 102 shown as field devices 102A to 102N, one or more field processing modules 106A and 106B, one or more bitbuses 112A to 112N, an auxiliary processing module 118, and a fieldbus 124.

A field device 102 can be any type of device for placement in an operational system or process. The field device 102 can include, by way of example, a temperature sensor, a pressure sensor, a flow sensor, a level sensor, a force sensor, a liquid detection sensor, a stress sensor, a motion sensor, a position sensor, a voltage sensor, a current sensor, a chemical property sensor, an actuator, a leak sensor, an accelerometer, a velocimeter, a valve positioner, a valve position sensor, an RFID tag, a smart card, a gauge including a pressure gauge, a solenoid, a power supply, a heater, a valve including a solenoid valve, a meter, a motor, a pump, a switch including a thermal switch, a Hall effect sensor, a magnetic intensity sensor, a gas sensor, an alert, a fusible link, an RFID tag, a smart card, a memory, among other devices used in factories, process plants, and semiconductor fabrication facilities. Such field devices 102 can also include a field device memory (not shown) or indicia that store data or parameters associated with the field device 102 or its application. As illustrated, in an operational implementation, a plurality of field devices 102A-N are deployed for sensing, actuating, and generating one or more field operational or operating characteristics 105A to 105N via one or more field device facilities 104A or communication links. The field device 102 and the field device facility 104A can be analog or digital.

One or more operating characteristics 105A to 105N can be any type of characteristic provided by one of the above identified field devices 102. The field operating characteristics 105 can include by way of example, in one form or another, a resistance, a current, a voltage, a Hall effect voltage, an energy, a mass, a power, including an electrical power, a capacitance, an inductance, a reluctance, a phase, a timing, a frequency, a time, a mode, a status, a failure, a position, a state, a magnetic intensity, data, and a parameter. In some embodiments, one or more of these operating characteristics can be representative of one or more other operating characteristics. For example, the operating characteristic 105 can be a resistance indicative of a sensed temperature when the field device 102 is a temperature sensor such as a resistance temperature detector (RTD), a thermopile, a resonance temperature sensor, an infrared sensor, and a thermistor. Additionally, the field device 102 can be operative to generate field operating characteristic 105 that is coded or encoded such that the code is representative of the field operating characteristic 105 such as one encoded in a bar code format, a radio frequency identification format, data matrix, or a smart card format.

The field device 102 can be associated with one or more operating processes or systems such as those illustrated as 130A to 130N and 132. The field device 102 communicates field operating characteristic 105 associated with the field device 102 and/or operating process or system 130 and 132 to a field processing module 106. The field processing module 106 includes a field device communication module 108 with an interface to communicate with the field device 102 and receive field operating characteristic 105. The field processing module 106 further includes a bitbus module or interface 110 for interfacing and communicating with a bitbus 112, which can include a bitbus modem. The field processing module 106 can also include other components not shown, including a processor, a memory, and software code or programs as will be discussed later.

Figure 3:
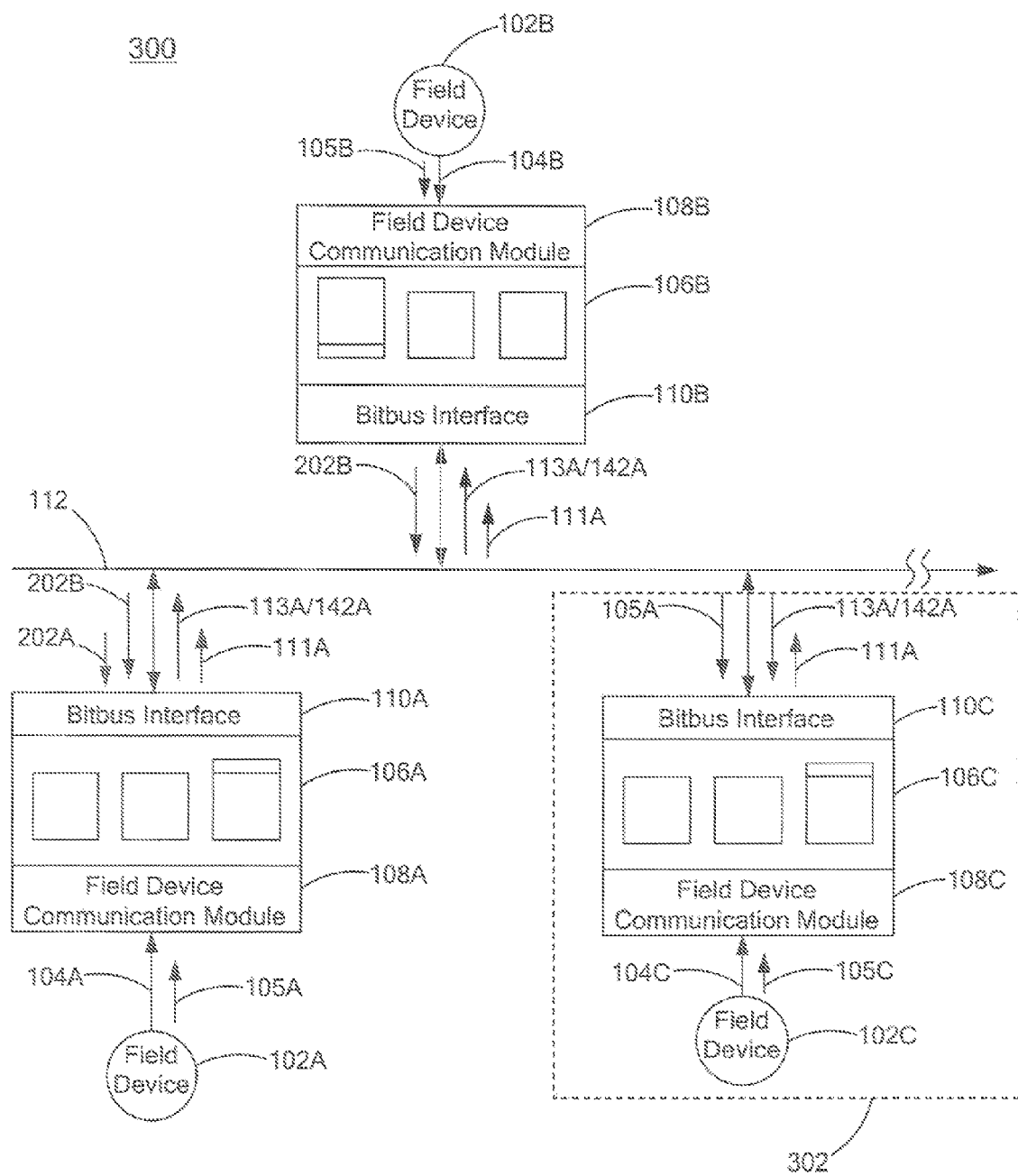
FIG. 3 is a block diagram of a field processing module system including peer-to-peer inter-working over a bitbus according to one embodiment of the invention.

The field processing module 106 generates a field operating data 111 that includes a field diagnostic parameter 113 as a function of the field operating characteristic 105. In some embodiments, the field diagnostic parameter 113 can be stored in a memory associated with the field processing module 106 or can be stored in the memory associated with the field device 102. The field operating data 111 can be configured to any type of configuration or format and, in one embodiment, can be compliant with a known industry standard such as IEEE 1451 and IEEE 1451.4. In an another embodiment, the field processing module 106 and the field device 102 are a single component, physical structure or mechanically integrated unit as shown in FIG. 3 as combined unit 302.

The bitbus 112 can be any bitbus including one compliant with a communication interface. The bitbus 112 can operate as analog, digital, or a combination of the two. In some embodiments, the bitbus 112 is configured as a single wire communication medium. Examples of known bitbus systems include a Dallas Semiconductor one-wire protocol, a Seriplex, a sensor bus, a DeviceNet™ bus, a FMS, Lon Works, a Car Automotive Network (CAN), an Interbus S, a SDLC, AS-Interface (AS-i), a Local Interconnect bus (LIN-bus), and a IEEE-1118 bus. In one embodiment, the bitbus 112 is a communication format that includes less than or equal to 8 bits. In another embodiment, a single bit in the bitbus protocol is representative of a field diagnostic parameter, field operating data 111, or the field operating characteristic 105.

The field processing module 106 can also include a field module memory 114, a field diagnostic component 115, and a field module processor 116 or processing unit. The field memory 114 can store one or more field administrative parameters and can include two related field administrative parameters such as a field diagnostic parameter. Additionally, the field memory 114 can store the received field operating characteristic 105. The field module processor 116 can include a microprocessor for processing the field operating characteristic and a field diagnostic component including at least one of an algorithm, a program, an artificial intelligence module, a neural network, a modeling module, a mapping, a graphical analysis, a rule, a fuzzy rule, a neural fuzzy model, a wavelet, a comparator, and a look-up table. The field diagnostic component 115 can include an algorithm, a program, an artificial intelligence module, a neural network, a modeling module, a mapping, a graphical analysis, a rule, a fuzzy rule, a neural fuzzy model, a comparator, and a look-up table. These can include any number of operational or computational operations. For example, in one embodiment of field diagnostic component 115, the field diagnostic component 115 may be an algorithm, a neural network, empirical data, numerical data, table look-up, fuzzy logic circuit, a wavelet, a neural fuzzy circuit, a polynomial algorithm, a residual life algorithm, an artificial intelligence module, a modeling module, a statistical function, and/or a loop current step response.

The field processing module 106 is configured to receive the field operating characteristic 105 and to generate a field operating data 111 that includes a field diagnostic parameter 113 as a function of the field operating characteristic 105. Field operating data can optionally include the field operating characteristic 105. The field processing module 106 communicates the operating data 111 over the bitbus interface 110 to the bitbus 112.

The field diagnostic parameter can be any type of parameter including an operational diagnostic, a device calibration, equipment diagnostic, a process diagnostics, a system administration diagnostic or command, and a system operation. Additionally, the field diagnostic parameter can be any diagnostic parameter including an event, a status, a failure, an alert, a mode, and a state. The field processing module 106 can be configured to determine the field diagnostic parameter as a function of the received field operating characteristic 105.

Additionally, the field processing module 106 can be configured to perform one or more operational functions associated with one of field devices 102, the field processing module 106, the bitbus 112, and the system 100. The field processing module 106 can perform an operational function, that can include by way of example, a device powering, a diagnostics, trouble shooting method, a statistical process control (SPC) computed parameter, fault detection, fault isolation, a root cause, a setting, a limit, a threshold, a calibration, a failure prediction, a maintenance procedure, a validation, a verification, a traceability, an auto-configuration, a system or architecture alignment, a fingerprint, an identification, a biometric identification, a theoretical modeling, a self-administration, and a self-tuning rule, model or algorithm, among others.

For example, where the field device 102 is a temperature sensor, the field processing module 106 can be configured to determine a sensed temperature as a function of field operating characteristic 105 and a field temperature diagnostic parameter. The field processing module 106 can determine the sensed temperature as a function of an EMF-to-temperature relationship defined by the field or temperature diagnostic parameter. Additionally, the field processing module 106 can determine a thermal characteristic of the field device 102 as a function of field operating characteristic 105. Where the field operating characteristic 105 can be a temperature characteristic indicative of a sensed energy level. As such, the field processing module 106 can compare the sensed energy level to a predefined energy level and identify a temperature diagnostic event when the difference between the sensed energy level and the predefined energy level is indicative of the temperature diagnostic event. Similarly, the field diagnostic component can be configured to determine a change in isothermal entropy.

In another embodiment, the field device 102 can be a heater and the field operating characteristic 105 is a heater characteristic.

In another embodiment, the field processing module 106 generates field operating data 111 in response to a field operating event or occurrence or can continuously provide the field operating data 111. In one optional embodiment, field processing module 106 is configured to determine the occurrence of at least one operating event, an administrative event, and/or a maintenance event. Examples of field operating events include, by way of example, a change of a state, a change of a mode, a change of a status, a failure, a change of a field parameter, a change of the field operating characteristic, a time rate of change of a temperature characteristic (first derivative), a value of a field parameter exceeding a threshold, and a value of the field operating characteristic exceeding a threshold.

In other embodiments, the field processing module 106 can include one or more other operational components such as an analog-to-digital conversion component (not shown). In such a case, the field device 102 can generate the field operating characteristic 105 in an analog format. The field processing module 106 receives the analog format and generates the field operating data 111 in a digital format. The field processing module 106 can also include a data compression component for compressing a portion or all of the field operating data 111 for communication over the bitbus 112. Such data compression can include a table mapping, an algorithm, and/or a coding. The field processing module 106 can further include a data encryption component for encrypting some or all of the data transmitted over the bitbus 112. In another embodiment, the field processing module 106 provides a digital-to-digital conversion when the field device 102 communicates digitally with the field processing module 106.

As an example of coding, the data compression component is configured for mapping the field diagnostic parameter to a prime number for communication over the bitbus 112. In such a case, a diagnostic character mapping or coding can increase the data transfer bandwidth of the bitbus 112 between the field device 102 and the field processing module 106. Two or more diagnostic parameters are associated with two or more diagnostic conditions of the field device 102 or the field processing module 106. The field processing module 106 provides for mapping each diagnostic parameter to a separate prime number in the field processing module 106. When the field processing module 106 determines that one or more of the diagnostic conditions exist, each of the associated prime numbers for those diagnostic conditions are stored and multiplied to determine a product number of each of the applicable prime numbers. The product number is transmitted to an auxiliary processing module 118 over bitbus 112. At the auxiliary processing module 118, the single product number is received and factored to determine the prime numbers and therefore the applicable diagnostic conditions identified by the field processing module 106. By multiplying each applicable prime number and transmitting the single product number, the current system provides for communication of the full set of diagnostic conditions within the restricted bandwidth of the bitbus 112.

In another embodiment, the field processing module 106 can be configured to generate a field administrative parameter 142 and communicate the field administrative parameter 142 to the field device 102. The field processing module 106 may also use an embedded function block with standardized and/or customized parameters. The field administrative parameter 142 can be any type of parameter, including a request, a query, or a command related to the administration or operation of the field device 102. In such an embodiment, the field device 102 would respond by generating the field operating characteristic 105 as a function of the received field administrative parameter 142. In operation, the field processing module 106 can generate the field administrative parameter 142 in response to an operating event, an administrative event, and/or a maintenance event, among others. The field administrative parameter 142 can be an instruction and/or a query. Alternatively, the field processing module 106 can generate the field administrative parameter 142 in response to receiving an auxiliary administrative parameter over the bitbus 112 from another entity such as another field processing module 106 or an auxiliary processing module 118.

In another embodiment, the system 100 includes a first field processing module 106A and a second field processing module 106B. The second field processing module 106B generates a second field operating data 111B and communicates with the bitbus 112. The second field processing module 106B communicates second field operating data 111B to the first field processing module 106A over the bitbus 112 in a peer-to-peer field processing module communication. Additionally, as auxiliary processing module 118 is coupled to the bitbus 112. The auxiliary processing module 118 can monitor peer-to-peer field processing module communications between two or more field processing modules 106. In such an embodiment, the auxiliary processing module 118 can initiate an administrative action, command, or message in response to the monitored peer-to-peer field processing module communications.

Similarly, a second field device 102B generates a second field operating characteristic 105B. The second field processing module 106B receives a second field operating characteristic 105B from the second field device 102B. The second field processing module 106B has a second field diagnostic component 115B and a second field communication component. The second field processing module 106B communicates with first field processing module 106A, a second administrative parameter, second field operating data 111B, a second field diagnostic parameter, and/or second field operating characteristic 105B. Additionally, as discussed above, the auxiliary processing module 118 can monitor the communication of the administrative parameter and/or operating data and can initiate an administrative action, command, or message in response to the monitored administrative parameter and/or operating data communications. As will be discussed, in alternative embodiments other field processing module 106 to the field processing module 106 peer-to-peer inter-workings and interactions are possible as illustrated in FIG. 3 as system 300.

Figure 2:
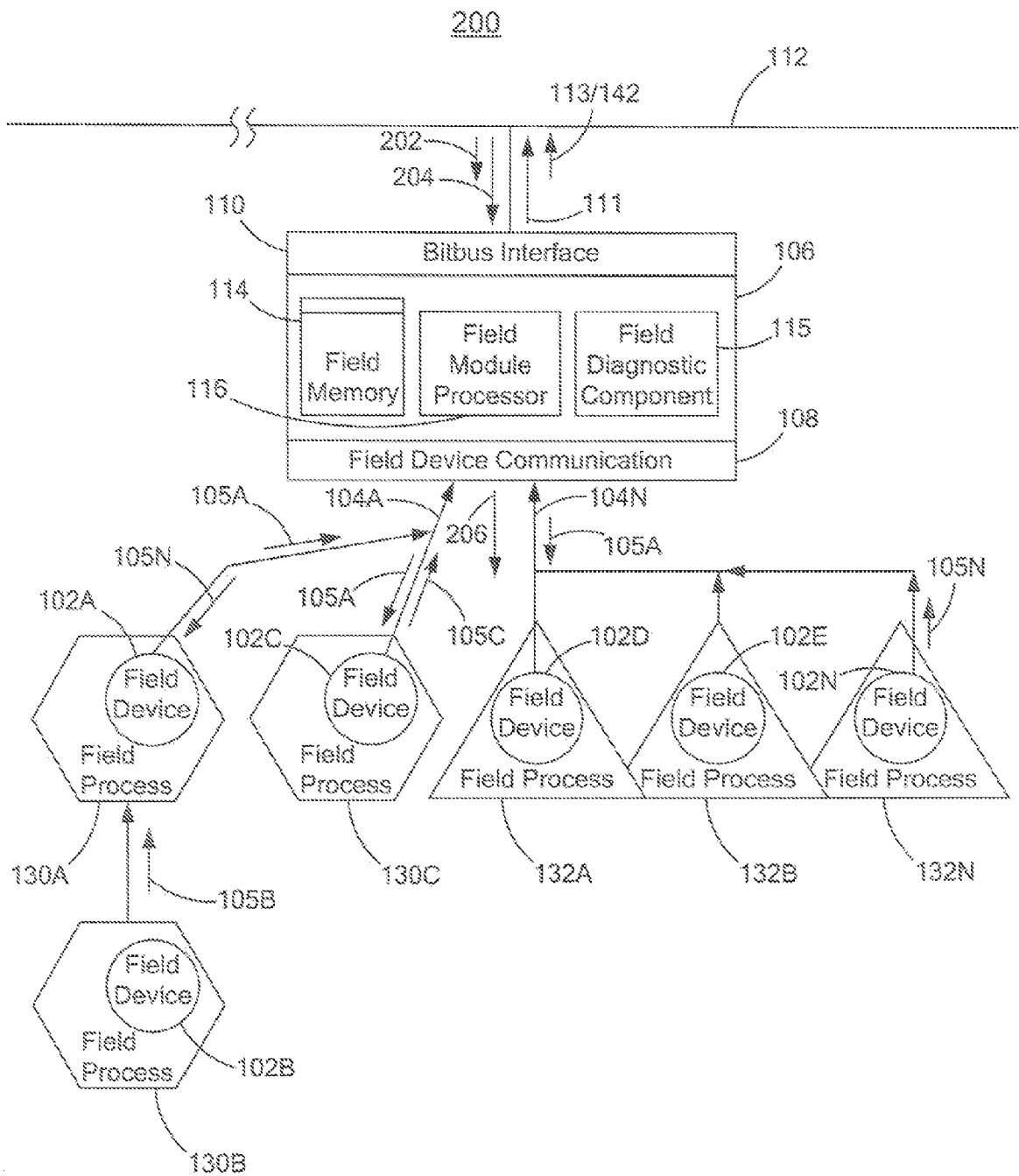
FIG. 2 is a block diagram of a field processing module monitoring and diagnostic system according to another embodiment of the invention.

As in FIG. 1, in yet another embodiment a first field device 102A and a second field device 102B can be coupled to a single or the same field processing module 106A. The second field device 102B generates second field operating characteristic 105B and field processing module 106A receives second field operating characteristic 105B and communicates the second field operating characteristic 105B to the first field device 102A. FIG. 2 illustrates system 200 that includes various peer-to-peer field devices 102 inter-working according to some additional embodiments of the invention.

Referring again to FIG. 1, the auxiliary processing module 118 includes a bitbus communication component 120 for interfacing with and communicating over the bitbus 112. Additionally, the auxiliary processing module 118 includes a fieldbus communication component 122 (or network communication component) for interfacing with and communicating over the fieldbus 124. The auxiliary processing module 118 can include an auxiliary module processor 126, an auxiliary module memory 128, an auxiliary diagnostic component 134, and an auxiliary gateway component 136. The auxiliary processing module 118 communicates with the bitbus 112 for receiving the field operating data 111. The auxiliary processing module 118 is configured to generate an auxiliary field data 138 as a function of field operating data 111 generated by the field processing module 106 and to communicate auxiliary field data 138 over the fieldbus 124. Optionally, the auxiliary processing module 118 can include an auxiliary diagnostic parameter, and generates the auxiliary field data 138 as a function of the auxiliary diagnostic parameter. In such a case, the auxiliary field data 138 can include the auxiliary diagnostic parameter. The auxiliary diagnostic parameter can be an operational diagnostic, a device calibration, a system administration, and a system operation. Also optionally, the auxiliary processing module 118 can also generate and/or communicate an auxiliary administrative parameter over the bitbus 112 to the field processing module 106.

The auxiliary module processor 126 can be a microprocessor having computer readable instructions including at least one of an algorithm, a rule, an artificial intelligence module, a modeling module, a mapping, a graphical analysis, a comparator, and a look-up table. The auxiliary processing module 118 can include an algorithm or similar functioning circuit or program that can include a neural network, an empirical data, a numerical data, a look-up table, a fuzzy logic circuit, a neural fuzzy circuit, a wavelet, a polynomial algorithm, a residual life algorithm, an artificial intelligence module, a modeling module, and a statistical function. In another embodiment, auxiliary diagnostic component 134 can include an algorithm, a rule, an artificial intelligence module, a modeling module, a mapping, a graphical analysis, a comparator, and a look-up table. The auxiliary module memory 128 can store the auxiliary parameter such as an auxiliary diagnostic parameter.

With one or more of these embodiments, auxiliary processing module 118 can be configured to perform an operational function associated with the field device 102, the field processing module 106, the bitbus 112, the auxiliary processing module 118, the fieldbus 124, and the system 100. The operational function can be any operational function including a diagnostics, a trouble shooting method, a statistical process control (SPC) computed parameter, a fault detection, a fault isolation, a root cause, a setting, an alert, an alarm, a comparison, a limit, threshold, a calibration, a failure prediction, a maintenance procedure, a validation, a verification, a traceability, an auto-configuration, a system or architecture alignment, a fingerprint, an identification, a biometric identification, a theoretical modeling, a self-administration, and a self-tuning rule.

The auxiliary processing module 118 can generate and/or communicate an auxiliary administrative parameter to the field processing module 106 over the bitbus 112. Such generation of the auxiliary administrative parameter can be in response to an auxiliary administrative event or an administrative instruction received over the fieldbus 124. The auxiliary processing module 118 can also provide electrical power to bitbus connected devices.

The auxiliary processing module 118 can also include a protocol converter component, a data concentrator component, an administrative component, an encryption component, and an inter-field processing module communication component. The protocol converter component can include capabilities for a conversion from a bitbus format to one or more fieldbus or network protocols. The data concentrator component could provide for concentrating data through coding or mapping or algorithm in order to concentrate transmitted data over the bitbus 112 or the fieldbus 124. Additionally, auxiliary processing module 118 can also include a data encryption component to provide for encrypting data to provide for increased security in the factory and process control systems.

The fieldbus 124 can include a communication format greater than 8 bits. For example, the fieldbus 124 can include a Profibus, an enterprise communication bus including an Ethernet TCP/IP, an Internet, a token ring LAN, an Ethernet LAN, an FDDI network, a private data network, an ISDN, a wireless network such as IEEE 802.11a, 802.11b or 802.11g, Zigbee, or WiMax, and a VPN. Additionally, the auxiliary bitbus communication component 120 can include a bitbus modem and the auxiliary fieldbus communication component 122 can include a fieldbus modem. The fieldbus 124 can utilize a variety of physical layer systems including wire, fiber, and wireless systems.

Additionally, as the field processing module 106 and the auxiliary processing module 118 are each communicating over the bitbus 112, each can be configured to interoperate to cooperate to perform an operational function on a distributed basis on behalf of or associated with the field device 102, the field processing module 106, the auxiliary processing module 118, the bitbus 112, and the system 100. The cooperative operational function can be a diagnostic, a trouble shooting method, a statistical process control (SPC) computed parameter, a fault detection, a fault isolation, a root cause, a setting, a limit, an alarm, a comparison, an alert, a threshold, a calibration, a failure prediction, a maintenance procedure, a validation, a verification, a traceability, an auto-configuration, an architecture alignment, a fingerprint, a biometric identification, an identification, a theoretical modeling, a self-administration, and a self-tuning rule.

As discussed above, in some embodiments system 100 includes the first field device 102A, the first field processing module 106A, the second field device 102B generating second field operating characteristic 105B, and the second field processing module 106B also communicating with the bitbus 112. The second field processing module 106B receives the second field operating characteristic 105B from the second field device 102B and generates a second field operating data 111B including a second field diagnostic parameter as a function of second field operating characteristic 105B. The auxiliary processing module 118 receives second field operating data 111B. The auxiliary processing module 118 also includes a supervisory module that generates supervisory data as a function of first field operating data 111A and second field operating data 111B. The auxiliary processing module 118 communicates the supervisory data over the fieldbus 124.

In another embodiment, the system 100 includes second field processing module 106B coupled to the second field device 102B and is coupled to a second bitbus 112B. The second bitbus 112B can also be coupled to the same auxiliary processing module 118 to which the first bitbus 112A are coupled. The auxiliary processing module 118 communicates with the second bitbus 112B and the first bitbus 112A. The auxiliary processing module 118 communicates to the first field processing module 106A one or more of a second administrative parameter, the second field operating data 111B, the second field diagnostic parameter, the second field operating characteristic 105B, and the field administrative parameter 142.

Figure 4:
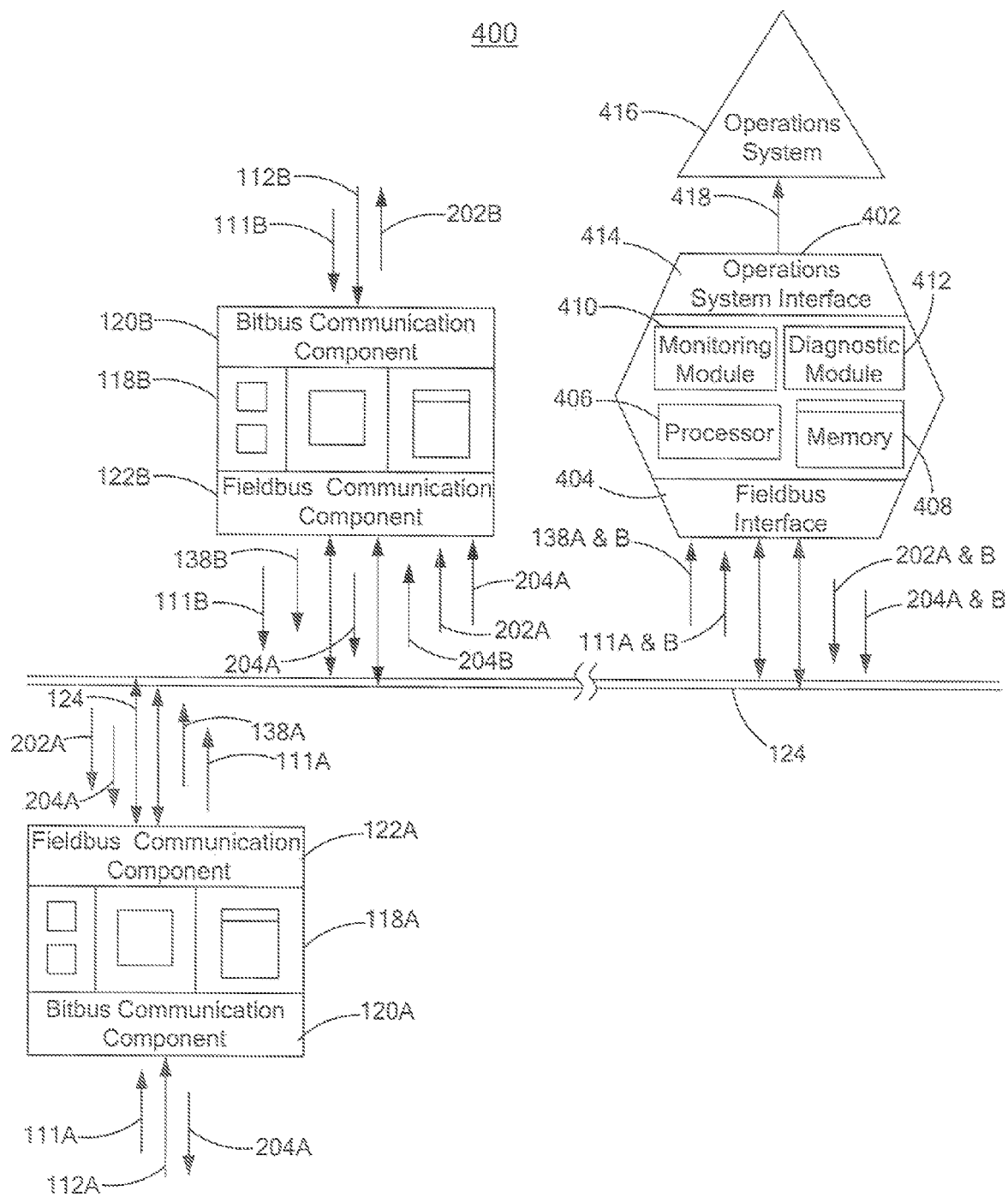
FIG. 4 is a block diagram of a fieldbus operational system with multiple auxiliary processing modules and an operational process management system according to one embodiment of the invention.

Referring to FIG. 4, a fieldbus operational system 400 with multiple auxiliary processing modules 118 and an operational process management system according to one embodiment of the invention. As illustrated, that first auxiliary processing module 118A and the second auxiliary processing module 118B are each coupled to the fieldbus 124. In such a situation, the second auxiliary processing module 118B can generate an administrative instruction and communicate the administrative instruction over the fieldbus 124 to the first auxiliary processing module 118A.

In one embodiment, the system 400 has a first field device 102A, first bitbus 112A, the first field processing module 106A and the first auxiliary processing module 118A. The system 400 also has a second field device 102B generating a second field operating characteristic 105B, a second field processing module 106B generating second field operating data 111B including a second field diagnostic parameter as a function of the second field operating characteristic 105B. The system 400 also has a second bitbus 112B communicating with the second field processing module 106B. A second auxiliary processing module 118B communicates with a second bitbus 112B and has a second fieldbus interface communication component 122B or interface for communicating over the fieldbus 124. In such an embodiment, the second field processing module 106B communicates with the first field processing module 106A via the second bitbus 112B, the second auxiliary processing module 118B, the fieldbus 124, the first auxiliary processing module 118A, and the first bitbus 112A.

Additionally, the auxiliary processing modules 118A and 118B can be configured for communicating auxiliary field data 138 over the fieldbus 124 to a field operations management system 402 which is also coupled to the fieldbus 124. The field operations management system 402 can be any type of management or administrative system for managing one or more operational functions of the operating system, operating environment, or system 100. For example, this can be a temperature management system for receiving and managing a plurality of temperature sensors.

The field operations management system 402 can include a fieldbus interface or communication module 404, a processor 406, a memory 408, a monitoring module 410, a diagnostic module 412, and an operations system module or interface 414. The operations system interface 414 interfaces to a communication facility 418 or operations system interface link that communicates with an operations system 416. The operations system 416 can be any operations, administration, controlling, or monitoring system including those known in the industry, by way of example, an Asset Management System, a SCADA system, a building energy management system, and a test system.

The field operations management system 402 can be configured to receive the auxiliary field data 138 and generating a field device control instruction as a function of the received auxiliary field data 138. The field operations management system 402 can also be configured for performing an operational function associated with the field device 102 and/or system 100 such as a diagnostics, a trouble shooting, a fault detection, a fault isolation, a root cause, a setting, an alarm, a comparison, an alert, a limit, a threshold, a calibration, a failure prediction, a maintenance procedure, a validation, verification, a traceability, an auto-configuration, an architecture alignment, a fingerprint, a biometric identification, an identification, a theoretical modeling, a self-administration, a self-tuning rule, and an operational device control. For example, the field operations management system 402 can generate an administrative instruction to one or more auxiliary processing modules 118, the field processing modules 106, or the field device 102.

Figure 5:
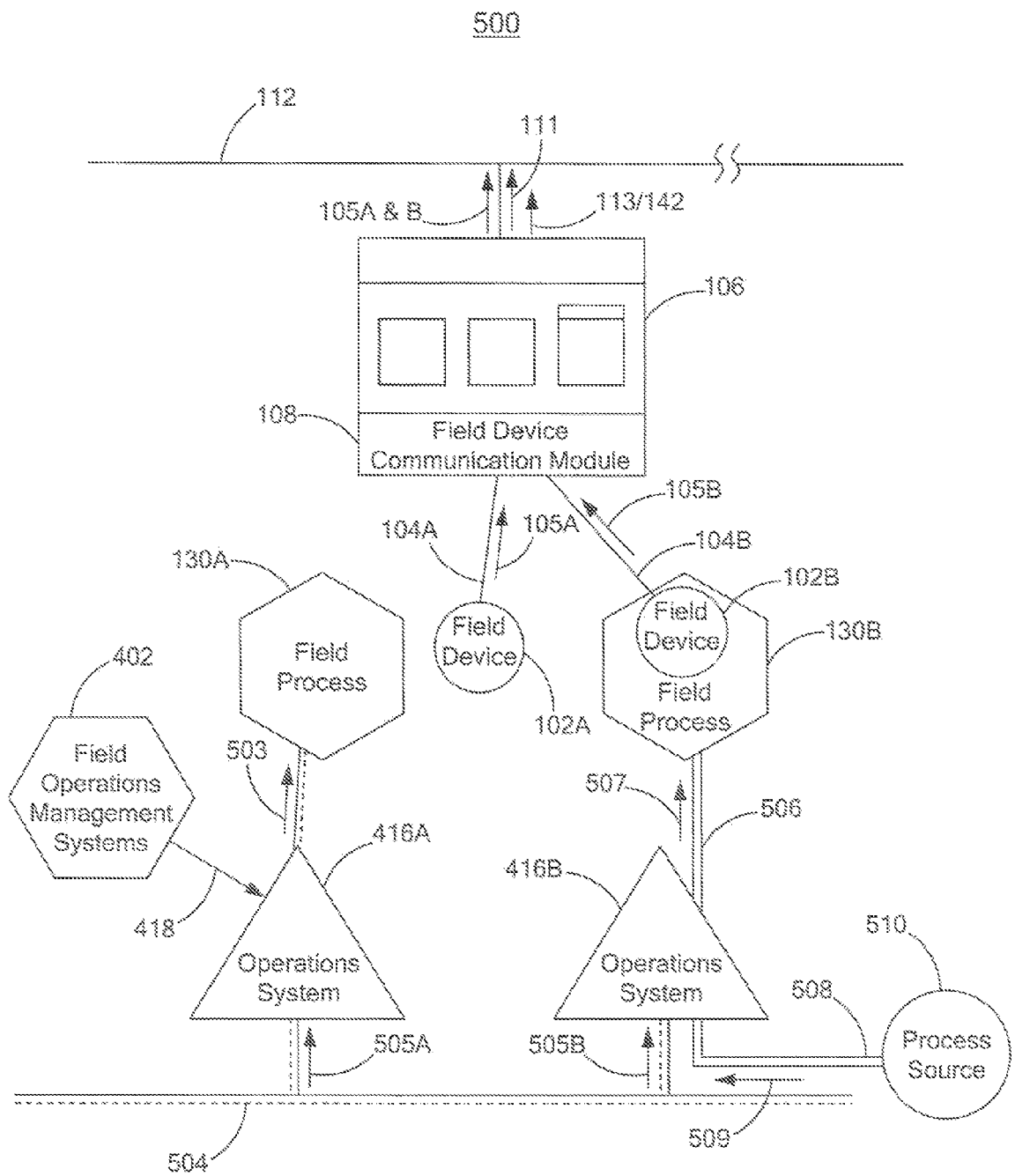
FIG. 5 is a block diagram of a field device operational environment system according to one embodiment of the invention.

Referring now to FIG. 5, a field device operational environment system 500 is illustrated. The field device 102 can be in proximity to field process or system 130 as illustrated with 102A in association with process 130A, or located on or in a process as illustrated as 102B in process 130B. In this embodiment, the process 130A is coupled via control facility 502 to operations system 416A for receiving operational control instruction or command 503. The operations system 416A is coupled to the operations management system 402 via the communication facility 418 and to an operations communication facility 504 for interfacing to other operations systems such as operations system 416B for receiving instruction or command 505A.

Similarly, the field process 130B is coupled to the operations system 416B via operational link 506 for receiving process input 507. The operations system 416 is also coupled to operations communication facility 504 for receiving instruction 505B. Additionally, the operations system 416B is coupled to process source 510 via process input source 508. The operations system 416B provides a portion of process input source 508 to process system 130B via the operational link 506 as process input 507.

Figure 6:
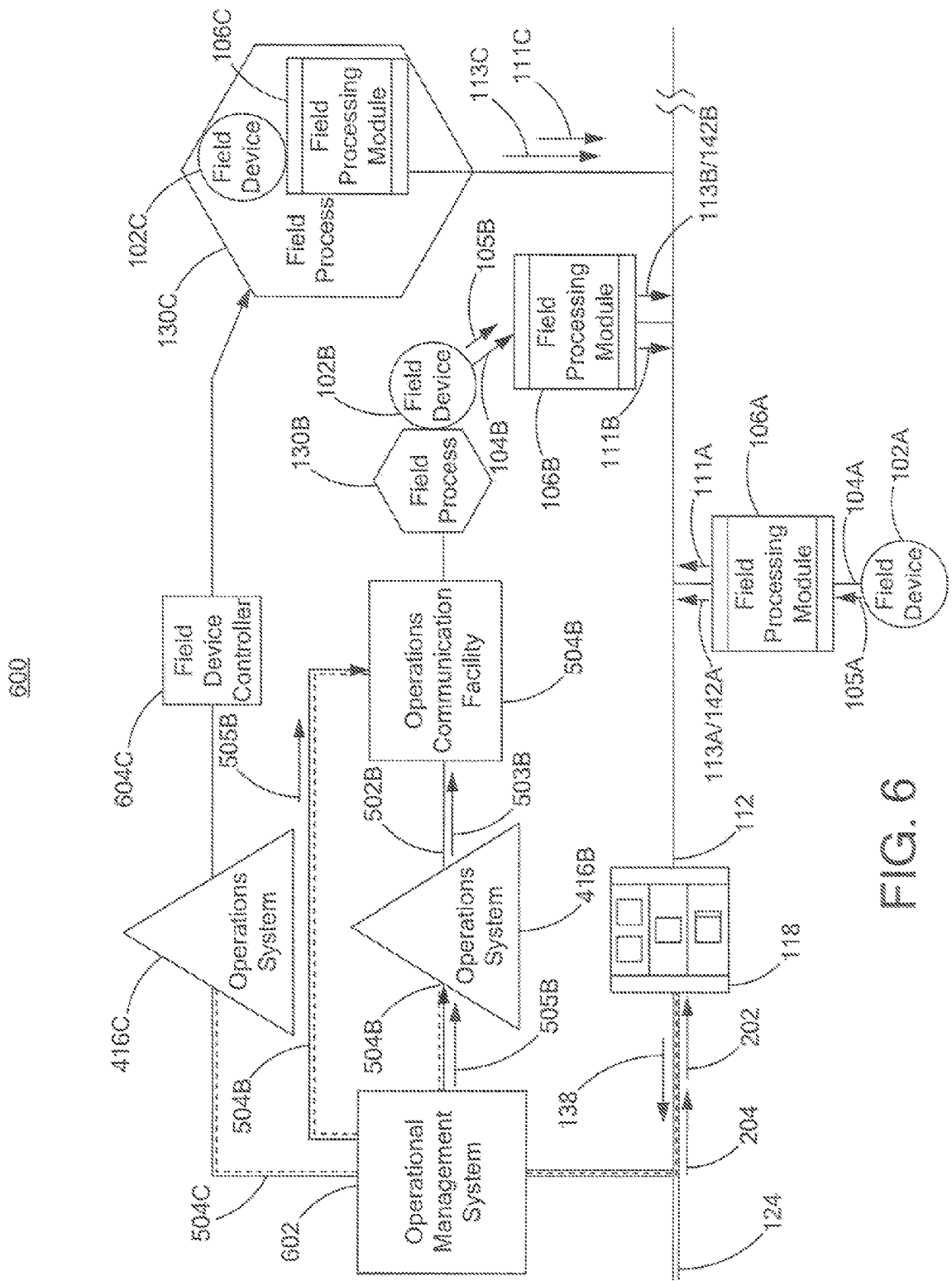
FIG. 6 is a block diagram of an operations environment with distributed diagnostic system according to one embodiment of the invention.

Referring now to FIG. 6, an operations environment with a distributed diagnostic system 600 is illustrated as one embodiment. Operational management system 602 communicates with a plurality of operations systems 416B and 416C, a field device controller 604B, and the auxiliary processing module 118.

In one embodiment, an operational device can be a heater coupled to a heater power circuit for receiving heating power from a power supply. The heater power circuit has a first interface, a second interface, and an intermediate portion between the first interface and the second interface. A power controller is coupled about the intermediate portion of the heater power circuit. The power controller has at least two states with a first state providing a portion of the power to the heater and a second state terminating power to the heater. The power controller includes the field device 102 and field processing module 106. In such an embodiment, the heater is in thermal proximity to the field device 102 which can be a temperature sensor. Field diagnostic component 115 of field processing module 106 can be configured to determine a mass flow in the heater as a function of the temperature characteristic.

In operation, embodiment of the invention can be implemented as a method of diagnosing a distributed operational system. In such a case, a method can include generating field operating characteristic 105 at the field device 102 and processing field operating characteristic 105 at field processing module 106. The method further includes generating field operating data 111 including a field diagnostic parameter as a function of field operating characteristic 105 and communicating field operating data 111 including the field diagnostic parameter over the bitbus 112 from field processing module 106 to the auxiliary processing module 118. The method also includes generating at the auxiliary processing module 118 auxiliary field data 138 as a function of received field operating data 111 and communicating the auxiliary field data 138 over the fieldbus 124.

In another implementation, a method of diagnosing a temperature sensing system includes a temperature sensor field device 102 generating field operating characteristic 105. The field processing module 106 generates the field operating data 111 including a temperature diagnostic parameter as a function of the temperature characteristic and communicates the field operating data 111 including the temperature diagnostic parameter over the bitbus 112 to the auxiliary processing module 118. The method further includes generating at the auxiliary processing module 118 the auxiliary field data 138 as a function of received field operating data 111 and communicating the auxiliary field data 138 over the fieldbus 124.

Some embodiments of the invention provide a distributed diagnostics computing architecture not currently available. The field device digital information is limited by the small message size and bandwidth of the bitbus 112. The limitations of the bitbus 112 are overcome by providing low level data related to the sensor, process, circuit, or thermal loop that is processed by the field processing module 106 and an auxiliary processing module 118 that includes a gateway function. The diagnostics circuit in the auxiliary processing module 118 can include a microprocessor, a memory and one or more algorithms for processing the bit level diagnostics parameters. The bit level parameters are processed by a diagnostics circuit and algorithm that can include: a neural network, a look-up table, a fuzzy logic circuit, a neural fuzzy circuit, a polynomial algorithm, a residual life algorithm, and/or a statistical function. The auxiliary processing module 118 may also interface to multiple sensors or actuators and contact multiple diagnostic circuits.

A field processing module 106 and the auxiliary processing module 118 working in conjunction with the bitbus 112 provide significantly lower cost monitoring and controlling solutions for operational systems and can include utilizing previously installed bitbus communications systems. Embodiments of the invention can provide added value and diagnostic functionality to existing monitoring and controlling systems without full replacement and rewiring of sometimes complex systems and implementations.

One or more of the embodiments of the invention provides for the distribution of diagnostic information processing between the field device 102 or sensor, the field processing module 106, and the auxiliary processing module 118 to provide for simplifying the sensor located in the operations process or system without requiring the implementation and deployment of expensive fieldbus systems. This system provides for use of the bitbus 112 to deliver the parameters required for diagnostics of the sensing system.

One or more embodiments described above can be operable in a variety of operational environments and situations. For example, one implementation of system 100 includes an energy balance application. In such an implementation, the field device 102 monitors energy flow in and out of an operational system. The field processing module 106 determines the energy transformed within operational system and stores efficiency parameters in the field memory 114. The field processing module 106 compares the energy in, the energy out, and the transformed energy using a diagnostic module or circuit including an algorithm and identifies an energy imbalance in the operating system or system 100. For example, an energy event can be identified when one of the energies or the energy imbalance is greater than a predetermined energy threshold. When such imbalance occurs, the field processing module 106 can generate an alarm to provide a message to the auxiliary processing module 118 including indicating the source of the imbalance and detailed data related to it.

In another example, the system 100 can operate to determine an isothermal entropy change. In such an implementation, the field device 102 measures a temperature of a field working unit such as a container for holding goods which is ideally near their freezing point. The field device 102 and/or the field processing module 106 characterizing the energy flow into and out of the container. The field processing module 106 compares the energy flow to the rate of temperature change of the container and identifies an energy flow condition such that the energy flow is greater than an energy flow threshold corresponding to a change in temperature of the container.

In yet another example, the system 100 can operate to determine an energy flow in a heater system with mass flow. In such an implementation, the system 100 measures the temperature of a process having mass flow. The system can provide for a heating of the process and a measurement of the resulting mass flow of the process. The field processing module 106 transmits the measured temperature and measured mass flow over the bitbus 112 to the auxiliary processing module 118. The auxiliary processing module 118 compares the calculated temperature rise to a given heater power input and generates a status message or an alarm message to indicate a mismatch between the calculated temperature and the measured temperature.

In another example of system 100, the system 100 operates a loop current step response (LCSR) method. In such an implementation, a temperature sensor is heated as an administrative action. A loop current step response test is performed and the measurements or field operating characteristics 105 are generated. The field processing module 106 receives the test results and characterizes the self heating data with at least a first order time constant utilizing an algorithm. The field processing module 106 stores the first order time constant from the characterizing in the field memory 114. The field processing module 106 compares the stored time constant to a current time constant from an LCSR test. A message, status or signal can be generated such as when the comparison is indicative of a change event or a change from the initial conditions.

Generally, the field processing module 106 and the auxiliary processing module 118 include an operating environment that can include a computer system with a computer that comprises at least one central processing unit (CPU), in conjunction with a memory system, an input device, and an output device. These elements are interconnected by at least one bus structure.

The CPU can be of familiar design and includes an arithmetic logic unit (ALU) for performing computations, a collection of registers for temporary storage of data and instructions, and a control unit for controlling operation of the system. Any of a variety of processors, including at least those from Digital Equipment, Sun, MIPS, Atmel, Motorola, NEC, Intel, Cyrix, AMD, HP, and Nexgen, is equally preferred for the CPU. The illustrated embodiment of the invention operates on an operating system designed to be portable to any of these processing platforms.

The memory system can generally include high-speed main memory in the form of a medium such as random access memory (RAM) and read only memory (ROM) semiconductor devices, and secondary storage in the form of long term storage mediums such as floppy disks, hard disks, tape, CD-ROM, flash memory and other devices that store data using electrical, magnetic, optical or other recording media. The main memory can also include video display memory for displaying images through a display device. Those skilled in the art will recognize that the memory system can comprise a variety of alternative components having a variety of storage capacities.

The input device can comprise, by way of example, a keyboard, a mouse, a smart card, a voice activated module, and a physical transducer (e.g. a microphone). The output device can comprise a display, a printer, a transducer/speaker. Some devices, such as a network adapter or a modem, can be used as input and/or output devices.

As is familiar to those skilled in the art, the computer system further includes an operating system and at least one application program. The application can perform one or more of the functions described above. The operating system is the set of software which controls the computer system's operation and the allocation of resources. The application program is the set of software that performs a task desired by the user, using computer resources made available through the operating system. Both are resident in the illustrated memory system.

In accordance with the practices of persons skilled in the art of computer programming, embodiment of the invention is described above with reference to symbolic representations of operations that are performed by the computer system. Such operations are sometimes referred to as being computer-executed or computer executable instructions. It will be appreciated that the operations which are symbolically represented include the manipulation by the CPU of electrical signals representing data bits and the maintenance of data bits at memory locations in the memory system, as well as other processing of signals. The memory locations where data bits are maintained are physical locations that have particular electrical, magnetic, or optical properties corresponding to the data bits. The invention can be implemented in a program or programs, comprising a series of instructions stored on a computer-readable medium. The computer-readable medium can be any of the devices, or a combination of the devices, described above in connection with the memory system.

Additionally, the bitbus 112 and the fieldbus 124 and each of the above identified communication modules and/or interfaces can be compatible with a hard-wired electrical communication facility, an optical facility, a wireless facility, a wireless telephonic facility, and a satellite facility.

When introducing aspects of the invention or embodiments thereof, the articles "a", "an", "the", and "said" are intended to mean that there are one or more of the elements. The terms "comprising", "including", and "having" are intended to be inclusive and mean that there can be additional elements other than the listed elements.

In view of the above, it will be seen that several advantages are achieved and other advantageous results attained. As various changes could be made in the above exemplary constructions and methods without departing from the scope of the invention, it is intended that all matter contained in the above description or shown in the accompanying drawings shall be interpreted as illustrative and not in a limiting sense.

It is further to be understood that the processes or steps described herein are not to be construed as necessarily requiring their performance in the particular order discussed or illustrated. It is also to be understood that additional or alternative processes or steps can be employed.

What is claimed is:

1. A distributed operations system with integrated diagnostics having a first bus and a second bus, the system comprising:
    a field device for generating a field operating characteristic;
    a field processing module for receiving the field operating characteristic from the field device, the field processing module includes a field diagnostic component and a field communication component configured for communication over the first bus, said field processing module is configured for generating field operating data including a field diagnostic parameter as a function of the field operating characteristic; and
    an auxiliary processing module configured for communicating with the first bus and receiving the field operating data, said auxiliary processing module including an auxiliary diagnostic component and an auxiliary communication component having a bus interface and a gateway component, said auxiliary processing module configured for generating auxiliary field data as a function of the field operating data and for communicating the auxiliary field data over the second bus;
    wherein the field operating characteristic is indicative of a sensed temperature and the field device is a temperature sensor selected from the group consisting of a thermocouple, a resistance temperature detector, a thermopile, a diode, a semiconductor sensor, a resonance temperature sensor, an infrared sensor, and a thermistor; and
    wherein the field processing module is configured for determining a sensed temperature as a function of the field operating characteristic and the field diagnostic parameter.

2. The system of claim 1 wherein the system is selected from the group consisting of a fabrication system, a packaging system, an engineering management system, a semiconductor tool, a manufacturing system, an assembly system, a processing system, an operational control system, an asset management system, a maintenance system including a predictive maintenance system, and a supervisory control and data acquisition system.

3. The system of claim 1 wherein the field operating characteristic is selected from the group consisting of a resistance, a current, a voltage, a Hall effect voltage, an energy, a mass, a power including an electrical power, a capacitance, an inductance, a reluctance, a phase, a timing, a frequency, a time, a mode, a status, a failure, a position, an alert, an alarm, a comparison, a state, a magnetic intensity, data, and a parameter.

4. The system of claim 1 wherein the field device is selected from the group consisting of a temperature sensor, a pressure sensor, a flow sensor, a level sensor, a force sensor, a leak detection sensor, a stress sensor, a motion sensor, a position sensor, a voltage sensor, a current sensor, a chemical property sensor, an actuator, a leak sensor, an accelerometer, a velocimeter, a valve positioner, a valve position sensor, an RFID tag, a smart card, a gauge including a pressure gauge, a solenoid, a power supply, a heater, a valve including a solenoid valve, a meter, a motor, a pump, a switch including a thermal switch, a Hall effect sensor, a magnetic intensity sensor, a gas sensor, a fusible link, an RFID tag, a smart card, and a memory device.

5. The system of claim 1 wherein the field processing module is configured for determining a thermal characteristic of the field device as a function of the field operating characteristic.

6. The system of claim 1 wherein the field device is configured to generate the field operating characteristic in at least one of encoded in a bar code format, a radio frequency identification format, a data matrix, and a smart card format.

7. The system of claim 1 wherein the field processing module generates the field operating data responsive to a field operating event.

8. The system of claim 7 wherein the field operating event is selected from the group consisting of a change of a state, a change of a mode, a change of a status, a failure, a change of a field parameter, a change of the field operating characteristic, a time rate of change of a temperature characteristic, a value of a field parameter exceeding a threshold, an alarm, a comparison, an alert, and a value of the field operating characteristic exceeding a threshold.

9. The system of claim 1 wherein the field operating data includes the field operating characteristic.

10. The system of claim 1 wherein the field processing module includes a field memory for storing one or more field administrative parameters.

11. The system of claim 10 wherein memory includes two related field administrative parameters.

12. The system of claim 11 wherein at least one of the field administrative parameters is the field diagnostic parameter.

13. The system of claim 11 wherein the memory is configured to store the received field operating characteristic.

14. The system of claim 1 wherein the field processing module includes a microprocessor.

15. The system of claim 1 wherein the field diagnostic component includes at least one of an algorithm, a program, an artificial intelligence module, a modeling module, a mapping, a graphical analysis, a rule, a comparator, and a look-up table.

16. The system of claim 1 wherein the field diagnostic component includes an algorithm selected from the group consisting of a neural network, an empirical data, a numerical data, a look-up table, a fuzzy logic circuit, a neural fuzzy circuit, a polynomial algorithm, a residual life algorithm, an artificial intelligence module, a wavelet, a modeling module, and a statistical function.

17. The system of claim 1 wherein the field diagnostic parameter is selected from the group consisting of an operational diagnostic, a device calibration, a system administration, and a system operation.

18. The system of claim 1 wherein field processing module is configured to determine the field diagnostic parameter as a function of the received field operating characteristic.

19. The system of claim 1 wherein the field processing module is configured to perform an operational function associated with at least one of the field devices, the field processing module, the first bus, and the system, said operational function being selected from the group consisting of a diagnostics, a trouble shooting method, a statistical process control computed parameter, a fault detection, a fault isolation, a root cause, a setting, a limit, a threshold, a calibration, a failure prediction, a maintenance procedure, a validation, a verification, a traceability, an auto-configuration, an architecture alignment, a fingerprint, an identification, a biometric identification, a theoretical modeling, a self-administration, a self-tuning rule, an operational device control.

20. The system of claim 1 wherein the field diagnostic parameter is selected from the group consisting of the field operating characteristic, an event, a status, a failure, a mode, and a state.

21. The system of claim 1 wherein the field processing module includes an analog-to-digital conversion component, and wherein the field device is configured to generate the field operating characteristic in an analog format and the field processing module generates the field operating data in a digital format.

22. The system of claim 1 wherein the field processing module includes a data compression component, said field processing module being configured for compressing at least a portion of the field operating data for communication over the first bus.

23. The system of claim 22 wherein the data compression component includes at least one of a table mapping, an algorithm, and a coding.

24. The system of claim 22 wherein the data compression component is configured for mapping the field diagnostic parameter to a prime number for communication over the first bus.

25. The system of claim 1 wherein the field processing module includes a data encryption component, said field processing module being configured for encrypting at least a portion of the field operating data for communication over the first bus.

26. The system of claim 1 wherein the field communication component includes a bus communication interface such that the field operating data is communicated to the first bus in a bus protocol.

27. The system of claim 1 wherein the field device and the field processing module are configured as a mechanically integrated unit.

28. The system of claim 1 wherein the field device is a first field device and the field processing module is a first field processing module, further comprising:
 a second field device for generating a second field operating characteristic; and
 a second field processing module for communicating with the first bus, said second field processing module for receiving the second field operating characteristic from the second field device, the second field processing module having a second field diagnostic component and a second field communication component,
 wherein the second field processing module is adapted for communicating to the first field processing module at least one of a second administrative parameter, a second field operating data, a second field diagnostic parameter, and the second field operating characteristic.

29. The system of claim 1 wherein the field device is a first field device, further comprising a second field device for generating a second operating characteristic, wherein the field processing module is configured to receive the second operating characteristic, the field processing module configured for communicating the received second operating characteristic to the first field device.

30. The system of claim 1 wherein the first bus, field communication component and auxiliary communication component are each selected from the group consisting of hard-wired electrical communication interface, optical interface, a wireless interface, and a satellite interface.

31. The system of claim 1 wherein the field communication component and the auxiliary communication component are configured to communicate with a bus protocol over the first bus.

32. The system of claim 1 wherein the field communication component and the auxiliary communication component are each a bus modem.

33. The system of claim 1 wherein the first bus is configured to communicate in a format that is less than or equal to 8 bits and the second bus is configured to communicate in a format greater than 8 bits.

34. The system of claim 1 wherein a single bit is representative of the field diagnostic parameter.

35. The system of claim 1 wherein the second bus is selected from the group consisting of a wireless network, an enterprise communication bus including an Ethernet TCP/IP, an Internet, a token ring LAN, an Ethernet LAN, an EDDI network, a private data network, an ISDN, and a VPN.

36. The system of claim 1 wherein the auxiliary processing module includes an auxiliary memory for storing at least one auxiliary parameter, said at least one auxiliary parameter including at least one auxiliary diagnostic parameter.

37. The system of claim 1 wherein the auxiliary processing module includes a microprocessor.

38. The system of claim 1 wherein the auxiliary diagnostic component includes at least one of an algorithm, an artificial intelligence module, a modeling module, a mapping, a graphical analysis, a rule, a comparator, and a look-up table.

39. The system of claim 1 wherein the auxiliary processing module includes an auxiliary diagnostic parameter, the auxiliary processing module configured for generating the auxiliary field data as a function of the auxiliary diagnostic parameter.

40. The system of claim 1 wherein the auxiliary processing module includes an auxiliary diagnostic parameter and wherein the auxiliary field data includes the auxiliary diagnostic parameter.

41. The system of claim 1 wherein the auxiliary processing module includes an auxiliary diagnostic parameter selected from the group consisting of an operational diagnostic, a device calibration, a system administration, and a system operation.

42. The system of claim 1 wherein the auxiliary processing module is configured for performing an operational function associated with at least one of the field device, the field processing module, the first bus, the auxiliary processing module, the second bus, and the system, the operational function being selected from the group consisting of a diagnostics, a trouble shooting method, a statistical process control computed parameter, a fault detection, a fault isolation, a root cause, a setting, a limit, a threshold, a calibration, a failure prediction, a maintenance procedure, a validation, a verification, a traceability, an auto-configuration, an architecture alignment, a fingerprint, an identification, a biometric identification, a theoretical modeling, a self-administration, a self-tuning rule, an operational device control.

43. The system of claim 1 wherein the auxiliary processing module includes an algorithm selected from the group consisting of a neural network, an empirical data, a numerical data, a table look-up, a fuzzy logic circuit, a neural fuzzy circuit, a polynomial algorithm, a residual life algorithm, a wavelet, an artificial intelligence module, a modeling module, and a statistical function.

44. The system of claim 1 wherein the auxiliary processing module is configured for communicating the auxiliary field data over the second bus to a field operations management system coupled to the second bus.

45. The system of claim 1 wherein the auxiliary processing module is configured for communicating an auxiliary administrative parameter to the field processing module over the first bus.

46. The system of claim 45 wherein the auxiliary processing module is configured for generating the auxiliary administrative parameter in response to an auxiliary administrative event.

47. The system of claim 1 wherein the auxiliary processing module includes at least one of a protocol converter component, a data concentrator component, an encryption component, an administrative component, and an inter-field processing module communication component.

48. The system of claim 1 wherein the field processing module and the auxiliary processing module are each configured to interoperate to perform an operational function for at least one of the field device, the field processing module, the auxiliary processing module, the first bus, and the system, said operational function being selected from the group consisting of a diagnostics, a trouble shooting method, a statistical process control computed parameter, a fault detection, a fault isolation, a root cause, a setting, a limit, a threshold, a calibration, a failure prediction, a maintenance procedure, a validation, a verification, a traceability, an auto-configuration, an architecture alignment, a fingerprint, an identification, a biometric identification, a theoretical modeling, a self-administration, a self-tuning rule, an operational device control.

49. A distributed operations system with integrated diagnostics having a first bus and a second bus, the system comprising:
a field device for generating a field operating characteristic;
a field processing module for receiving the field operating characteristic from the field device, the field processing module includes a field diagnostic component and a field communication component configured for communication over the first bus, said field processing module is configured for generating field operating data including a field diagnostic parameter as a function of the field operating characteristic; and
an auxiliary processing module configured for communicating with the first bus and receiving the field operating data, said auxiliary processing module including an auxiliary diagnostic component and an auxiliary communication component having a bus interface and a gateway component, said auxiliary processing module configured for generating auxiliary field data as a function of the field operating data and for communicating the auxiliary field data over the second bus;
wherein the field operating characteristic is indicative of a sensed temperature and the field device is a temperature sensor selected from the group consisting of a thermocouple, a resistance temperature detector, a thermopile, a diode, a semiconductor sensor, a resonance temperature sensor, an infrared sensor, and a thermistor; and
wherein the sensed temperature is determined as a function of an EMF-to-temperature relationship defined by the field diagnostic parameter.

50. A distributed operations system with integrated diagnostics having a first bus and a second bus, the system comprising:
a field device for generating a field operating characteristic;
a field processing module for receiving the field operating characteristic from the field device, the field processing module includes a field diagnostic component and a field communication component configured for communication over the first bus, said field processing module is configured for generating field operating data including a field diagnostic parameter as a function of the field operating characteristic; and
an auxiliary processing module configured for communicating with the first bus and receiving the field operating data, said auxiliary processing module including an auxiliary diagnostic component and an auxiliary communication component having a bus interface and a gateway component, said auxiliary processing module configured for generating auxiliary field data as a function of the field operating data and for communicating the auxiliary field data over the second bus;
wherein the field operating data includes a product of a plurality of prime numbers, wherein at least one of the plurality of prime numbers is representative of a field diagnostic parameter.

51. A distributed operations system with integrated diagnostics having a first bus and a second bus, the system comprising:
a field device for generating a field operating characteristic;
a field processing module for receiving the field operating characteristic from the field device, the field processing module includes a field diagnostic component and a field communication component configured for communication over the first bus, said field processing module is configured for generating field operating data including a field diagnostic parameter as a function of the field operating characteristic; and
an auxiliary processing module configured for communicating with the first bus and receiving the field operating data, said auxiliary processing module including an auxiliary diagnostic component and an auxiliary communication component having a bus interface and a gateway component, said auxiliary processing module configured for generating auxiliary field data as a function of the field operating data and for communicating the auxiliary field data over the second bus;
wherein the field processing module is configured for generating a field administrative parameter and communicates the field administrative parameter to the field device, and wherein the field device generates the field operating characteristic as a function of the received field administrative parameter.

52. The system of claim 51 wherein the field processing module generates the field administrative parameter responsive to at least one of an operating event, an administrative event, and a maintenance event.

53. The system of claim 51 wherein the field administrative parameter is at least one of an instruction and a query.

54. The system of claim 51 wherein the field processing module generates the field administrative parameter in response to receiving an auxiliary administrative parameter over the first bus.

55. A distributed operations system with integrated diagnostics having a first bus and a second bus, the system comprising:

a field device for generating a field operating characteristic;

a field processing module for receiving the field operating characteristic from the field device, the field processing module includes a field diagnostic component and a field communication component configured for communication over the first bus, said field processing module is configured for generating field operating data including a field diagnostic parameter as a function of the field operating characteristic; and an auxiliary processing module configured for communicating with the first bus and receiving the field operating data, said auxiliary processing module including an auxiliary diagnostic component and an auxiliary communication component having a bus interface and a gateway component, said auxiliary processing module configured for generating auxiliary field data as a function of the field operating data and for communicating the auxiliary field data over the second bus;

wherein the field device includes a field device memory storing a second field diagnostic parameter and wherein the field device provides the second field diagnostic parameter to the field processing module.

56. A distributed operations system with integrated diagnostics having a first bus and a second bus, the system comprising:

a field device for generating a field operating characteristic;

a field processing module for receiving the field operating characteristic from the field device, the field processing module includes a field diagnostic component and a field communication component configured for communication over the first bus, said field processing module is configured for generating field operating data including a field diagnostic parameter as a function of the field operating characteristic; and an auxiliary processing module configured for communicating with the first bus and receiving the field operating data, said auxiliary processing module including an auxiliary diagnostic component and an auxiliary communication component having a bus interface and a gateway component, said auxiliary processing module configured for generating auxiliary field data as a function of the field operating data and for communicating the auxiliary field data over the second bus;

wherein the field processing module is a first field processing module, further comprising a second field processing module configured for generating second field operating data and in communication with the first bus, said second field processing module communicating second field operating data to the first field processing module over the first bus.

57. A distributed operations system with integrated diagnostics having a first bus and a second bus, the system comprising:

a field device for generating a field operating characteristic;

a field processing module for receiving the field operating characteristic from the field device, the field processing module includes a field diagnostic component and a field communication component configured for communication over the first bus, said field processing module is configured for generating field operating data including a field diagnostic parameter as a function of the field operating characteristic; and an auxiliary processing module configured for communicating with the first bus and receiving the field operating data, said auxiliary processing module including an auxiliary diagnostic component and an auxiliary communication component having a bus interface and a gateway component, said auxiliary processing module configured for generating auxiliary field data as a function of the field operating data and for communicating the auxiliary field data over the second bus;

wherein the field device is a first field device and the field processing module is a first field processing module, further comprising:

a second field device for generating a second field operating characteristic; and a second field processing module for communicating with the first bus, said second field processing module for receiving the second field operating characteristic from the second field device, the second field processing module having a second field diagnostic component and a second field communication component, said second field processing module configured for generating second field operating data including a second field diagnostic parameter as a function of the second field operating characteristic, wherein the auxiliary field processing module is adapted to receive the second field operating data and wherein said auxiliary field processing module includes a supervisory module generating supervisory data as a function of the first field operating data and the second field operating data, said auxiliary field processing module configured to communicate the supervisory data over the second bus.

58. A distributed operations system with integrated diagnostics having a first bus and a second bus, the system comprising:

a field device for generating a field operating characteristic;

a field processing module for receiving the field operating characteristic from the field device, the field processing module includes a field diagnostic component and a field communication component configured for communication over the first bus, said field processing module is configured for generating field operating data including a field diagnostic parameter as a function of the field operating characteristic; and an auxiliary processing module configured for communicating with the first bus and receiving the field operating data, said auxiliary processing module including an auxiliary diagnostic component and an auxiliary communication component having a bus interface and a gateway component, said auxiliary processing module configured for generating auxiliary field data as a function of the field operating data and for communicating the auxiliary field data over the second bus;

wherein the field device is a first field device, and the field processing module is a first field processing module, further comprising:

a second field device for generating a second field operating characteristic;

a second field processing module for receiving the second field operating characteristic from the second field device, the second field processing module having a second field diagnostic component and a second field communication component, the second field processing module configured for generating second field operating data including a second field diagnostic parameter as a function of the second field operating characteristic; and a third bus for communicating with the second field processing module, wherein the auxiliary processing module is adapted for communicating with the third bus and the first bus, the auxiliary processing module being configured for communicating to the first field processing module at least one of a second administrative parameter, the second field operating data, the second field diagnostic parameter, the second field operating characteristic, and a field administrative parameter.

59. A distributed operations system with integrated diagnostics having a first bus and a second bus, the system comprising:
   a field device for generating a field operating characteristic;
   a field processing module for receiving the field operating characteristic from the field device, the field processing module includes a field diagnostic component and a field communication component configured for communication over the first bus, said field processing module is configured for generating field operating data including a field diagnostic parameter as a function of the field operating characteristic; and
   an auxiliary processing module configured for communicating with the first bus and receiving the field operating data, said auxiliary processing module including an auxiliary diagnostic component and an auxiliary communication component having a bus interface and a gateway component, said auxiliary processing module configured for generating auxiliary field data as a function of the field operating data and for communicating the auxiliary field data over the second bus;
   wherein the first bus is configured as a single wire communication medium.

60. A distributed operations system with integrated diagnostics having a first bus and a second bus, the system comprising:
   a field device for generating a field operating characteristic;
   a field processing module for receiving the field operating characteristic from the field device, the field processing module includes a field diagnostic component and a field communication component configured for communication over the first bus, said field processing module is configured for generating field operating data including a field diagnostic parameter as a function of the field operating characteristic; and
   an auxiliary processing module configured for communicating with the first bus and receiving the field operating data, said auxiliary processing module including an auxiliary diagnostic component and an auxiliary communication component having a bus interface and a gateway component, said auxiliary processing module configured for generating auxiliary field data as a function of the field operating data and for communicating the auxiliary field data over the second bus;
   wherein the auxiliary processing module is configured for communicating the auxiliary field data over the second bus to a field operations management system coupled to the second bus;
   wherein the field operations management system is configured for receiving the auxiliary field data and for generating a field device control instruction as a function of the received auxiliary field data.

61. A distributed operations system with integrated diagnostics having a first bus and a second bus, the system comprising:
   a field device for generating a field operating characteristic;
   a field processing module for receiving the field operating characteristic from the field device, the field processing module includes a field diagnostic component and a field communication component configured for communication over the first bus, said field processing module is configured for generating field operating data including a field diagnostic parameter as a function of the field operating characteristic; and
   an auxiliary processing module configured for communicating with the first bus and receiving the field operating data, said auxiliary processing module including an auxiliary diagnostic component and an auxiliary communication component having a bus interface and a gateway component, said auxiliary processing module configured for generating auxiliary field data as a function of the field operating data and for communicating the auxiliary field data over the second bus;
   wherein the auxiliary processing module is configured for communicating the auxiliary field data over the second bus to a field operations management system coupled to the second bus;
   wherein the field operations management system is configured for performing an operational function associated with at least one of the field device and the system, said operational function being selected from the group consisting of a diagnostics, a trouble shooting method, a statistical process control computed parameter, a fault detection, a fault isolation, a root cause, a setting, a limit, a threshold, a calibration, a failure prediction, a maintenance procedure, a validation, a verification, a traceability, an auto-configuration, an architecture alignment, a fingerprint, an identification, a biometric identification, a theoretical modeling, a self-administration, a self-tuning rule, an operational device control.

62. A distributed operations system with integrated diagnostics having a first bus and a second bus, the system comprising:
   a field device for generating a field operating characteristic;
   a field processing module for receiving the field operating characteristic from the field device, the field processing module includes a field diagnostic component and a field communication component configured for communication over the first bus, said field processing module is configured for generating field operating data including a field diagnostic parameter as a function of the field operating characteristic; and
   an auxiliary processing module configured for communicating with the first bus and receiving the field operating data, said auxiliary processing module including an auxiliary diagnostic component and an auxiliary communication component having a bus interface and a gateway component, said auxiliary processing module configured for generating auxiliary field data as a function of the field operating data and for communicating the auxiliary field data over the second bus;
   wherein the auxiliary processing module is configured for communicating an auxiliary administrative parameter to the field processing module over the first bus;
   wherein the auxiliary processing module is configured for generating the auxiliary administrative parameter in response to an administrative instruction received over the second bus.

63. A distributed operations system with integrated diagnostics having a first bus and a second bus, the system comprising:
   a field device for generating a field operating characteristic
   a field processing module for receiving the field operating characteristic from the field device, the field processing module includes a field diagnostic component and a field communication component configured for communication over the first bus, said field processing module is configured for generating field operating data including a field diagnostic parameter as a function of the field operating characteristic; and an auxiliary processing module configured for communicating with the first bus and receiving the field operating data, said auxiliary processing module including an auxiliary diagnostic component and an auxiliary communication component having a bus interface and a gateway component, said auxiliary processing module configured for generating auxiliary field data as a function of the field operating data and for communicating the auxiliary field data over the second bus;

wherein the auxiliary processing module is configured for communicating an auxiliary administrative parameter to the field processing module over the first bus;

wherein the auxiliary processing module is configured for generating the auxiliary administrative parameter in response to an auxiliary administrative event;

wherein a field operations management system coupled to the second bus is configured for generating the administrative instruction.

64. A distributed operations system with integrated diagnostics having a first bus and a second bus, the system comprising:

a field device for generating a field operating characteristic;

a field processing module for receiving the field operating characteristic from the field device, the field processing module includes a field diagnostic component and a field communication component configured for communication over the first bus, said field processing module is configured for generating field operating data including a field diagnostic parameter as a function of the field operating characteristic; and an auxiliary processing module configured for communicating with the first bus and receiving the field operating data, said auxiliary processing module including an auxiliary diagnostic component and an auxiliary communication component having a bus interface and a gateway component, said auxiliary processing module configured for generating auxiliary field data as a function of the field operating data and for communicating the auxiliary field data over the second bus;

wherein the auxiliary processing module is configured for communicating an auxiliary administrative parameter to the field processing module over the first bus;

wherein the auxiliary processing module is configured for generating the auxiliary administrative parameter in response to an auxiliary administrative event;

wherein the auxiliary processing module is a first auxiliary processing module, further comprising:

a second auxiliary processing module coupled to the second bus, said second auxiliary processing module configured for generating the administrative instruction and for communicating the administrative instruction over the second bus to the first auxiliary processing module.

65. A distributed operations system with integrated diagnostics having a first bus and a second bus, the system comprising:

a field device for generating a field operating characteristic;

a field processing module for receiving the field operating characteristic from the field device, the field processing module includes a field diagnostic component and a field communication component configured for communication over the first bus, said field processing module is configured for generating field operating data including a field diagnostic parameter as a function of the field operating characteristic; and an auxiliary processing module configured for communicating with the first bus and receiving the field operating data, said auxiliary processing module including an auxiliary diagnostic component and an auxiliary communication component having a bus interface and a gateway component, said auxiliary processing module configured for generating auxiliary field data as a function of the field operating data and for communicating the auxiliary field data over the second bus;

wherein the field device is a first field device, the field processing module is a first field processing module, and the auxiliary processing module is a first auxiliary processing module, further comprising:

a second field device for generating a second field operating characteristic;

a second field processing module coupled to the second field device, the second field processing module including a second field diagnostic component and a second field communication component, the second field processing module configured for receiving the second field operating characteristic from the second field device and for generating second field operating data including a second field diagnostic parameter as a function of the second field operating characteristic;

a third bus adapted for communication with the second field processing module; and a second auxiliary processing module for communicating with the third bus and having a second bus interface for communicating over the second bus, wherein said second field processing module is configured to communicate with the first field processing module via the third bus, the second auxiliary processing module, the second bus, the first auxiliary processing module, and the first bus.

66. The system of claim 65 wherein said the second field processing module is configured for communicating to the first field processing module at least one of a second administrative parameter, the second field operating data, the second field diagnostic parameter, and the second field operating characteristic.

67. A distributed operations system with integrated diagnostics having a first bus and a second bus, the system comprising:

a field device for generating a field operating characteristic;

a field processing module for receiving the field operating characteristic from the field device, the field processing module includes a field diagnostic component and a field communication component configured for communication over the first bus, said field processing module is configured for generating field operating data including a field diagnostic parameter as a function of the field operating characteristic; and an auxiliary processing module configured for communicating with the first bus and receiving the field operating data, said auxiliary processing module including an auxiliary diagnostic component and an auxiliary communication component having a bus interface and a gateway component, said auxiliary processing module configured for generating auxiliary field data as a function of the field operating data and for communicating the auxiliary field data over the second bus;

a heater coupled to a heater power circuit for receiving heating power from a power supply, the heater power circuit having a first interface, a second interface, and an intermediate portion between the first interface and the second interface; and a power controller coupled about the intermediate portion of the heater power circuit, the power controller having at least two states, a first state for providing at least a portion of the power to the heater and a second state for terminating power to the heater, said power controller including the field device and the field processing module.

68. A distributed operations system with integrated diagnostics having a first bus, a first field device for generating a first field operating characteristic, and a second field device for generating a second field operating characteristic, the system comprising:

a first field processing module for receiving the first field operating characteristic from the first field device, the first field processing module includes a first field diagnostic component and a first field communication component configured for communication over the first bus, said first field processing module is configured for generating first field operating data including a first field diagnostic parameter as a function of the first field operating characteristic;

a second field processing module for receiving the second field operating characteristic from the second field device, the second field processing module having a second field diagnostic component and a second field communication component configured for communication over the first bus, said second field processing module being configured for generating second field operating data including a second field diagnostic parameter as a function of the second operating characteristic; and an auxiliary processing module configured for communicating with the first bus and receiving the first field operating data from the first field processing module and the second field operating data from the second field processing module, said auxiliary processing module including an auxiliary diagnostic component and an auxiliary communication component having a second bus interface and a gateway component, said auxiliary processing module configured for generating auxiliary field data as a function of at least one of the first field operating data and the second field operating data and for communicating the auxiliary field data over a second bus.

69. The system of claim 68 wherein the auxiliary field processing module includes a supervisory module generating supervisory data as a function of the first field operating data and the second field operating data, said auxiliary field processing module configured to communicate the supervisory data over the second bus.

70. The system of claim 68 further comprising a third bus, wherein the first field communication component is configured for communication with the first bus and the second field communication component is configured for communication with the third bus, the auxiliary processing module being configured for communicating with the first bus for receiving the first field operating data and configured for communicating with the third bus for receiving the second field operating data.

71. The system of claim 70, further comprising a second auxiliary processing module for communicating with the third bus and having a second bus interface for communicating over the second bus, wherein said second field processing module is configured to communicate with the first field processing module via the third bus, the second auxiliary processing module, the second bus, the first auxiliary processing module, and the first bus.

72. The system of claim 68 wherein the first field processing module is configured to receive the second field operating data and to transmit the second field operating data over the first bus as a function, at least in part, of the received second field operating data.

73. A distributed operations system with integrated diagnostics having a first bus, the system comprising:

a first field device for generating a first field operating characteristic;

a second field device for generating a second field operating characteristic;

a field processing module for receiving the first field operating characteristic from the first field device and the second field operating characteristic from the second field device, the field processing module including a field diagnostic component and a field communication component for communicating with the first bus, the field processing module being configured for generating field operating data including at least one of a first field diagnostic parameter as a function of the first field operating characteristic and a second field diagnostic parameter as a function of the second field operating characteristic; and an auxiliary processing module configured for communicating with the first bus and receiving the generated field operating data, said auxiliary processing module including an auxiliary diagnostic component and an auxiliary communication component having a bus interface and a gateway component, said auxiliary processing module configured for generating auxiliary field data as a function of the received field operating data and for communicating the auxiliary field data over a second bus.

74. The system of claim 73 wherein the field processing module is configured to transmit the received second operating characteristic to the first field device.

\* \* \* \* \*